United States Patent
Dearing et al.

(10) Patent No.: US 9,454,501 B2
(45) Date of Patent: Sep. 27, 2016

(54) INTELLIGENT PATCH PANEL PORT MONITORING SYSTEM

(71) Applicant: Leviton Manufacturing Co., Inc., Melville, NY (US)

(72) Inventors: Mark Edward Dearing, Bothell, WA (US); Jason Erickson, Bothell, WA (US); Jeff Storm, Bothell, WA (US); Jay Treptow, Bothell, WA (US); Hua Wang, Bothell, WA (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 0 days.

(21) Appl. No.: 14/319,903

(22) Filed: Jun. 30, 2014

(65) Prior Publication Data

US 2015/0039788 A1    Feb. 5, 2015

Related U.S. Application Data

(60) Provisional application No. 61/860,195, filed on Jul. 30, 2013.

(51) Int. Cl.
*G06F 13/20* (2006.01)
*H04L 12/28* (2006.01)
*H01R 13/66* (2006.01)
*H01R 29/00* (2006.01)
*G06F 3/00* (2006.01)
*G06F 13/38* (2006.01)

(52) U.S. Cl.
CPC ............ *G06F 13/385* (2013.01); *G06F 13/20* (2013.01)

(58) Field of Classification Search
None
See application file for complete search history.

(56) References Cited

U.S. PATENT DOCUMENTS

| | | | |
|---|---|---|---|
| 2006/0148279 A1* | 7/2006 | German | H01R 13/465 439/49 |
| 2007/0117444 A1* | 5/2007 | Caveney | H04Q 1/136 439/404 |
| 2007/0238343 A1* | 10/2007 | Velleca | H01R 9/2475 439/188 |
| 2010/0267274 A1* | 10/2010 | McNally | H04Q 1/136 439/488 |
| 2011/0043371 A1* | 2/2011 | German | H04Q 1/136 340/815.45 |
| 2011/0141943 A1* | 6/2011 | Shifris | H04Q 1/136 370/254 |
| 2013/0064249 A1* | 3/2013 | Shar | H04Q 1/136 439/404 |
| 2015/0236873 A1* | 8/2015 | Austermann, III | H04L 25/0278 375/220 |

* cited by examiner

*Primary Examiner* — David E Martinez
(74) *Attorney, Agent, or Firm* — Amin, Turocy & Watson, LLP

(57) ABSTRACT

A universal serial bus (USB) sensor bar and a device manager are configured to intelligently monitor one or more patch panels. The USB sensor bar comprises an array of sensors configured to read identification data from memory devices affixed to respective cables plugged into ports of a patch panel. The USB sensor bar converts the identification data to a USB protocol and sends the data to a device manager over a USB bus. The device manager uses the received information to document a network architecture, generate web-based interfaces that render configuration and status information for the network, and generate alarms or notifications in response to detection of defined network conditions.

20 Claims, 38 Drawing Sheets

INTELLIGENT PATCH PANEL PORT MONITORING SYSTEM

CROSS-REFERENCE TO RELATED APPLICATIONS

This application claims priority to U.S. Provisional Application Ser. No. 61/860,195, filed on Jul. 30, 2013, and entitled "INTELLIGENT PATCH PANEL PORT MONITORING SYSTEM," the entirety of which is incorporated by reference.

TECHNICAL FIELD

The disclosed subject matter relates generally to monitoring of patch panels and, for example, to an intelligent patch panel port monitoring system that includes a universal serial bus (USB) sensor bar and a USB device manager that documents a network architecture based on data received from the sensor bar

BACKGROUND

Patch panels are widely used to manage network cable connections between networked devices and/or network infrastructure equipment. Typically, incoming and outgoing network cables are affixed to the back side of the patch panel, with each cable wired to a respective port located on the front face of the panel. Connections between the networked devices can then be managed by connecting selected ports on the front of the patch panel together using patch cables. Patch panels allow a technician to easily reroute, isolate, segment, or reconfigure physical networks from a single location.

While conventional patch panels can conveniently organize network connections at a single location and facilitate flexible re-arrangement and expansion of network connections, unmonitored patch panels require a network administrator or technician to be present at the panel in order to determine, by visual inspection, which ports and associated network branches are connected together. Tracking and documenting these network connections can be a laborious undertaking. Moreover, network reconfigurations made by a technician at the patch panel can easily go undocumented, requiring other technicians to visually inspect the patch panel connections in order to determine how the connections have been altered.

The above-described deficiencies of conventional patch panel systems are merely intended to provide an overview of some of the problems of current technology, and are not intended to be exhaustive. Other problems with the state of the art, and corresponding benefits of some of the various non-limiting embodiments described herein, may become further apparent upon review of the following detailed description.

SUMMARY

The following presents a simplified summary of the disclosed subject matter in order to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

Various embodiments relate to an intelligent patch panel port monitoring system that facilitates accurate remote monitoring of connectivity statuses of a network infrastructure. In one or more embodiments, the system can comprise a USB sensor bar located on or within a patch panel. The USB sensor bar contains port sensing technology that can read patch cable identification data from cable plugs inserted into respective ports of the patch panel (e.g., from a 1-wire chip or other memory mounted on the plug). The sensor bar can deliver the patch cable identification data to a device manager via a USB connection. Based on information received from the USB sensor bar, the device manager can document the network architecture and provide status information for the network. For example, some embodiments of the device manager can generate a graphical user interface that renders substantially real-time connectivity status information for the network (e.g., identification of which ports/devices are connected together, statuses of the respective devices, network diagrams, etc.). In some embodiments, the device manager can include a web server that securely publishes the user interface to the Internet, allowing the network statuses to be viewed remotely. The device manager can leverage the information provided by the USB sensor bar to document a user's network architecture, generate alarms and/or notifications in response to defined events (e.g., connections, disconnections, etc.), or perform other tasks to be described in more detail herein.

In one or more embodiments, the USB sensor bar can be an integrated component of the patch panel. In other embodiments, the USB sensor bar can comprise a retrofittable overlay panel that mounts to the front of a conventional patch panel, thereby converting a standard copper patch panel or fiber enclosure to an intelligent panel/enclosure that can be monitored by the device manager.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative embodiments beyond those described in this summary.

DETAILED DESCRIPTION

Figure 1:
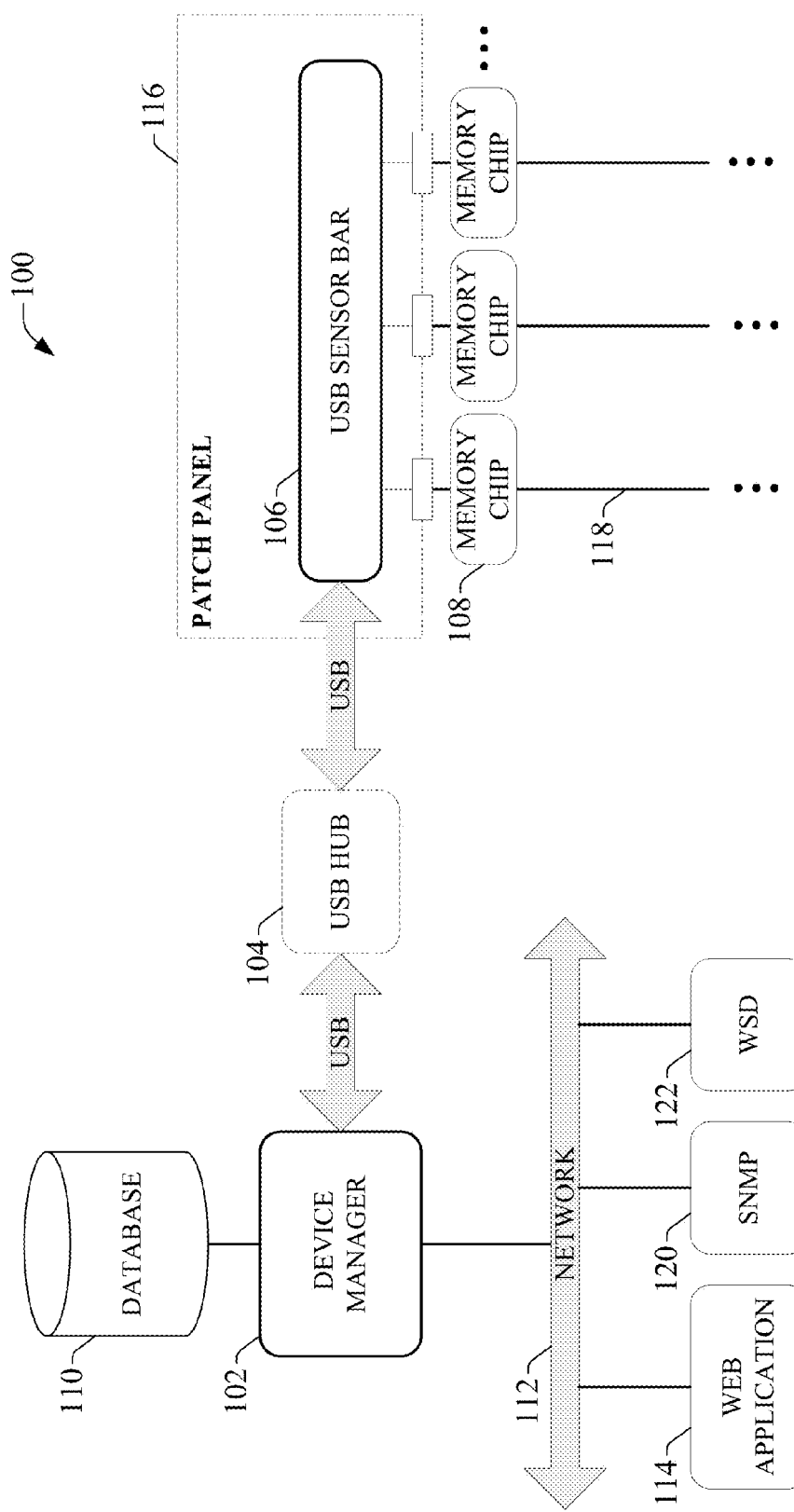
FIG. 1 illustrates a general overview of an intelligent patch panel port monitoring system.

The subject disclosure is now described with reference to the drawings wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As used in the subject specification and drawings, the terms "object," "module," "interface," "component," "system," "platform," "engine," "selector," "manager," "unit," "store," "network," "generator" and the like are intended to refer to a computer-related entity or an entity related to, or that is part of, an operational machine or apparatus with a specific functionality; such entities can be either hardware, a combination of hardware and firmware, firmware, a combination of hardware and software, software, or software in execution. In addition, entities identified through the foregoing terms are herein generically referred to as "functional elements." As an example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer-readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As an example, a component can be an apparatus with specific functionality provided by mechanical parts operated by electric or electronic circuitry, which is operated by software, or firmware application executed by a processor, wherein the processor can be internal or external to the apparatus and executes at least a part of the software or firmware application. As another example, a component can be an apparatus that provides specific functionality through electronic components without mechanical parts, the electronic components can include a processor therein to execute software or firmware that confers at least in part the functionality of the electronic components. Interface(s) can include input/output (I/O) components as well as associated processor(s), application(s), or API (Application Program Interface) component(s). While examples presented hereinabove are directed to a component, the exemplified features or aspects also apply to object, module, interface, system, platform, engine, selector, manager, unit, store, network, and the like.

FIG. 1 provides a general overview of an intelligent patch panel port monitoring system 100 according to one or more embodiments. Monitoring system 100 comprises a USB sensor bar 106 incorporated as part of a patch panel 116. As will be described in more detail infra, USB sensor bar 106 can be provided as a pre-integrated component of an intelligent patch panel 116. Alternatively, patch panel 116 may be a standard copper patch panel or fiber optic enclosure, and USB sensor bar 106 can be provided as a modular component that mounts as an overlay on the front of patch panel 116 or an equivalent fiber optic enclosure. In this way, patch panel 116 can be converted to an intelligent panel capable of reading identification data from memory chips 108 (e.g., 1-wire chips or other storage media) attached to the plugs of respective patch cords 118. When a patch cord or port blocker plug outfitted with a memory chip 108 is inserted into a port of patch panel 116, a sensing circuit on the USB sensor bar 106 reads the identification information from the memory chip 108 on the plug and thus identifies the plug and its location on the panel.

USB sensor bar 106 interfaces with a device manager 102 via a USB connection, either directly or via a USB hub 104. Device manager 102 receives cable and port identification data from the USB sensor bar 106 via the USB connection for processing. Based on the identification data received from USB sensor bar 106, device manager 102 generates and stores network documentation information including, for example, records of network connections and statuses. Device manager 102 can also present network status information to a user via a graphical user interface; e.g., by sending network status data to a client device via network 112 (e.g., an Ethernet network or the Internet). Exemplary client devices can include, but are not limited to, devices running a Web application 114, a Simple Network Management Protocol (SNMP) application 120, or a WSD application 122.

In general, device manager 102 serves as a liaison between USB sensor bar 106 and end user applications (e.g., applications 114, 120, and/or 122), Data Center Infrastructure Management (DCIM) software packages, or mobile devices. In some embodiments, device manager 102 can comprise USB ports for interfacing with the network device side (either directly or via USB hub 104), and a TCP/IP network interface for exchanging data with the end user side (e.g., via network 112), where the TCP/IP network interface can be interfaced, for example, via a web browser. Using a web browser interface, a user can configure and manage the device manager 102, obtain current or historical views of the network architecture and/or connected devices, view topology configuration information, or generate network status reports. Although some examples described herein assume a TCP/IP protocol for interfacing with end user devices, some embodiments of device manager 102 can support other protocols for interfacing with the end user side without departing from the scope of this disclosure.

In some configurations, monitoring system 100 can also include a database 110 for storage of current and/or historical network status information. Database 110 can be an integrated component of device manager 102, or can comprise a separate storage device communicatively connected to device manager 102 (as depicted in the example system of FIG. 1).

Figure 2:
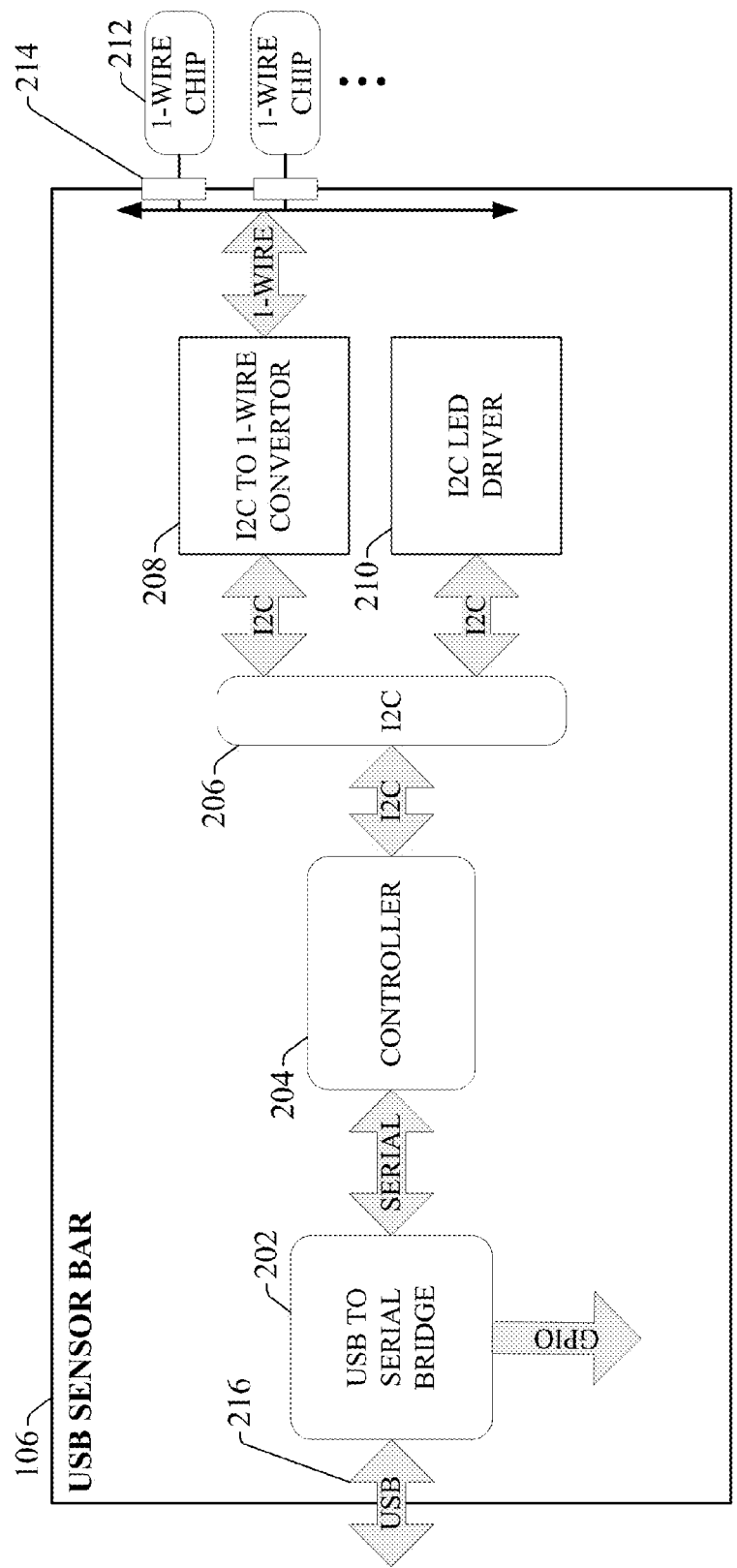
FIG. 2 illustrates functional components of an example USB sensor bar.

USB sensor bar 106 and device manager 102 are now described in more detail with reference to FIGS. 2-6. FIG. 2 illustrates a number of functional components of USB sensor bar 106 according to one or more embodiments. It should be noted that different versions of USB sensor bar 106 can be provided that are compatible with respective different types of patch cables, including but not limited to copper cables (e.g. CAT-6 cables having registered jack connectors) or fiber patch cables. These different versions can vary according to the type and design of sensor used to read the cable identification data, the location of the sensors, relative to the port, the design and locations of the patch panel ports, and other such design factors. In general, the high-level components illustrated in FIG. 2 are not dependent upon the type of patch cable (e.g., copper or fiber) with which the USB sensor bar is designed for use.

USB sensor bar 106 is configured to read data from memory chips attached to cable plugs inserted into ports 214. In the illustrated example, the memory chips comprise 1-wire memory chips 212. Each 1-wire memory chip 212 contains identification data uniquely associated with the respective cables plugged into the ports 214. When a cable (e.g., a copper or fiber cable) fitted with a 1-wire memory chip is plugged into a port 214, sensor bar 106 reads the identification data from the chip. The data read can be transacted by an on-board controller 204 in response to detection of a new plug being inserted into a port. Controller 204 can transact the data read operation via an inter-integrated circuit (I2C) bus 206 to an I2C to 1-wire converter 208.

Figure 3:
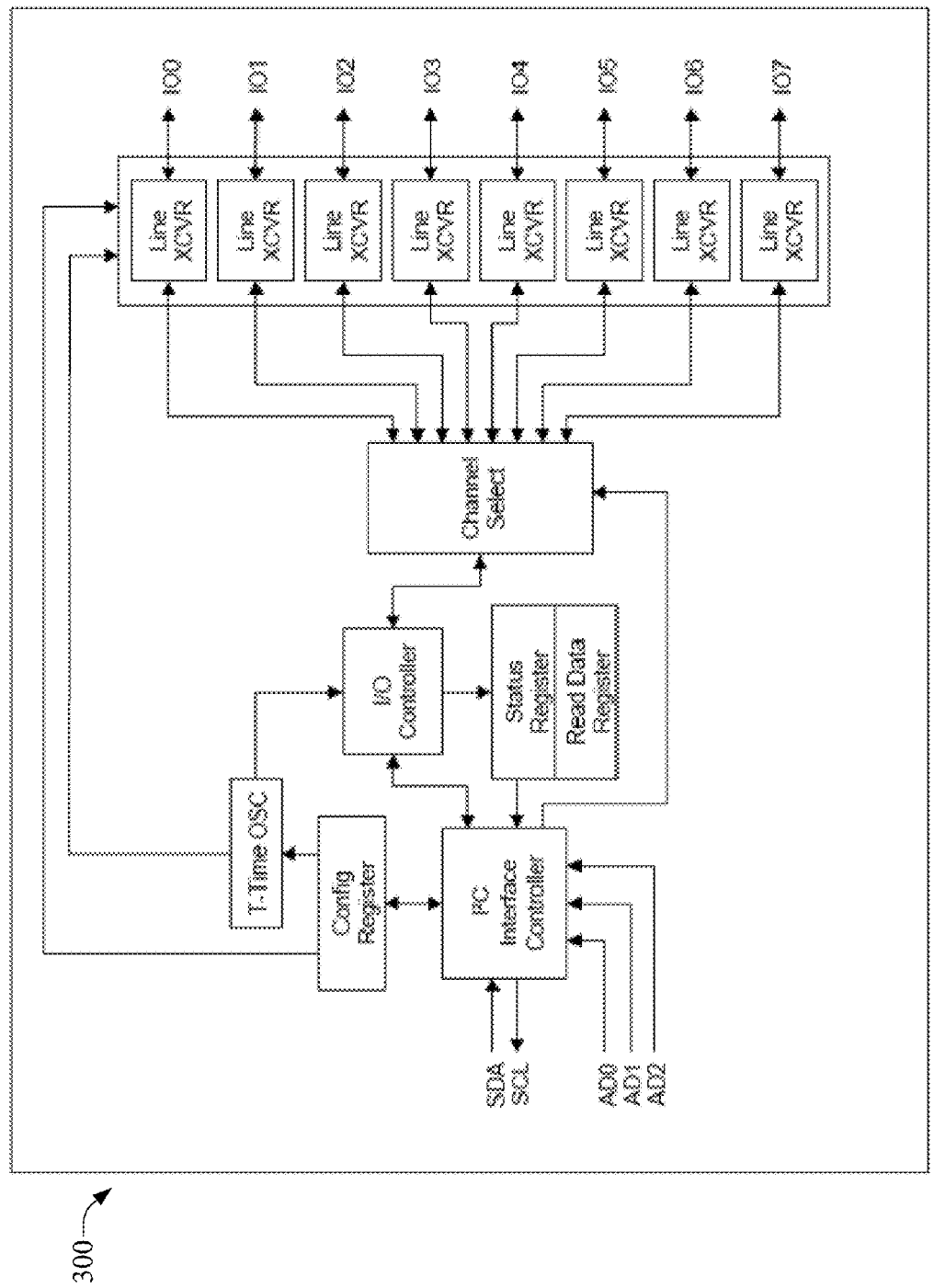
FIG. 3 illustrates an example 8-channel multiplexor capable of performing conversion between I2C and 1-wire protocol.

In some embodiments, I2C to 1-wire converter 208 can comprise a 1-wire to I2C multiplexor capable of reading identification data from multiple 1-wire memory chips 212 and placing the data on the I2C bus 206. An exemplary 8-channel multiplexer 300 capable of performing conversion between I2C and 1-wire protocol is illustrated in FIG. 3. Multiplexer 300 can allow reader firmware loaded on USB sensor bar 106 to associate a particular 1-wire memory chip with a given port. Multiplexer 300 can also provide fault isolation between individual ports 214 (corresponding to channels IO0-IO7 in FIG. 3), mitigating the possibility that a short on a single port will render all other ports on the sensor bar inoperable.

Returning now to FIG. 2, controller 204 can store data read from the 1-wire memory chips 212 in a port map array, buffer the data, and subsequently send the data to device manager 102 via USB bus 216 when requested by the device manager. The port map array can document each detected cable identifier together with the sensor bar port number from which the identifier was read. To facilitate delivery of the port map array data to the device manager, USB sensor bar 106 can include a USB to Serial bridge 202 that passes data between the USB bus 216 and controller 204. In this way, USB sensor bar 106 can provide device manager 102 with data required to build a database of sensor bars and port-to-port patch cable connections. USB Sensor bar 106 can also receive control and request messages from device manager 102 via USB bus 216 (e.g., control messages to set an LED panel indicator, request messages to send the port map array, etc.).

In the example illustrated in FIG. 2, the link between controller 204 and USB to Serial bridge 202 is depicted as a serial connection (e.g., serial with system management bus). For such systems, controller 204 can convert the buffered data from I2C protocol to serial protocol and send the converted data to the USB to Serial bridge 202 for delivery to the device manager. However, any suitable format may be used for the link between controller 204 and bridge 202, including but not limited to another I2C link.

One or more embodiments of USB sensor bar 106 can also include an I2C LED driver 210 configured to control one or more LED panel indicators on the front of USB sensor bar 106. For example, each port 214 of USB sensor bar 106 may have an associated LED indicator that illuminates when a plug is inserted into the port's jack, and blinks to indicate data activity. LED indicators may also be color-coded to indicate a communication and/or integrity status for each port.

Operation of the various sensor bar components illustrated in FIG. 2 may be controlled by sensor bar firmware that executes on controller 204. For example, in one or more embodiments, the sensor bar firmware may continually monitor the I2C components (e.g., I2C bus 206 and I2C to 1-wire converter 208) for changes to the patch panel connectivity (e.g., a new plug being inserted into a port or an existing plug being removed from a port). In response to detection of such a change, controller 204 can send a message via the USB bus 216 to device manager 102. This configuration can mitigate the need for the device manager to ping the USB sensor bar 106 periodically for port connectivity updates. Instead, USB sensor bar 106 sends notifications to the device manager only in response to a port array change detected by the USB sensor bar 106.

The sensor bar firmware can also consume incoming command messages received at the USB to Serial bridge 202, and respond by sending appropriate commands to the I2C components or by sending return messages back through USB to Serial bridge 202, depending on the nature of the received command.

To facilitate management of multiple USB sensor bars by the device manager, USB sensor bar 106 can have an associated identification number or character string that can be read and tracked by the device manager. In some embodiments, the identification number can be set using a programming tool that interfaces with the USB to serial bridge 202 via USB bus 216. The identification number or character string can be saved to non-volatile memory on the USB to serial bridge 202 and set as the USB device identifier.

Table 1 below lists a number of exemplary device manager commands supported by one or more embodiments of USB sensor bar 106. It is to be appreciated that the command set listed in Table 1 is only intended to be exemplary, and any suitable set of sensor bar commands are within the scope of this disclosure.

TABLE 1

Sensor Bar Command Set

| Device Manager Cmd | Description | Response | Notes |
| --- | --- | --- | --- |
| 1 | Set Status LEDs | No Response | Set each port LED to off/on or one of two flash rates |
| 2 | Post Tag ID map to USB Tx buffer | Map of 16-byt Tag IDs | Read the RAM storage of each port for Tag ID and post the array |
| 3 | Post Sensor bar firmware version to USB Tx buffer | Version Number | Write Sensor Bar firmware version information to Tx buffer |
| 4 | Set Tag IDs | Map of 16-byte Tag IDs | Writes Tag IDs to 1-wire RAM, post all Tag IDs to Tx buffer |
| 5 | Post Status LED map to USB Tx Buffer | Map of Status LED settings | Writes LED status map to Tx buffer |
| 6 | Post 1-Wire Serial Number map to Tx buffer | Map of 1-wire UID serial numbers | Read the non-volatile serial number from port 1-wire chips and post to Tx buffer |

The following are exemplary byte streams for the commands listed in Table 1.

The byte stream for command 1 to Set Status LEDs is as follows:

| Cmd | Len L | Len H | Freq0 | Pwm0 | Freq1 | Pwm1 | L 1-4 | ... | L 21-24 |
| --- | --- | --- | --- | --- | --- | --- | --- | --- | --- |
| 1 | 0x0A | 0x00 | 0-255 | 0-255 | 0-255 | 0-255 | 4 × 2 bits | ... | 4 × 2 bits |

Where:

Cmd: Command Byte = 1

Len L = 10 bytes for payload = 0x0A

Len H = payload is less than 256, therefore = 0

Freq0 = Blink Frequency Prescaler 0

Pwm0 = Blink Pulse Width Modulation 0

Freq1 = Blink Frequency Prescaler 1

Pmw1—Blink Pulse Width Modulation 1

L 1-4 = LED display states for LEDs 1 to 4

L 5-8 = LED display states for LEDs 5 to 8

L 9-12 = LED display states for LEDs 9 to 12

L 13-16 = LED display states for LEDs 13 to 16

L 17-20 = LED display states for LEDs 17 to 20

L 21-24 = LED display states for LEDs 21 to 24

The byte stream for command 2 for posting the 1-Wire tag IDs to the device manager is as follows:

| Cmd | Len L | Len H |
|-----|-------|-------|
| 2   | 0x00  | 0x00  |

Where:
Cmd: Command Byte = 2
Len L = 0 bytes for payload = 0
Len H = payload is less than 256, therefore = 0

The reply message to command 2 is the same as the command, with the payload appended:

| Cmd | Len L | Len H | P1[0-15] | ... | P24[0-15] | FW Ver |
|-----|-------|-------|----------|-----|-----------|--------|
| 2   | 0x88  | 0x01  | 16 Bytes | ... | 16 Bytes  | 8 Bytes |

Where:
Cmd: Command Byte = 2
Len L = payload byte count low = 136 = 0x88
Len H = payload byte count high total payload count is 392 high byte is 1
P1-P24 = Port TagID. 16 bytes × number of ports on sensor bar
FW Ver = Firmware version = 4 16-bit integers. The four integers are major version, minor version, day count (e.g., days since Jan. 1, 2013), build count on day count.

The byte stream for command 3 for posting the firmware version to the device manager is as follows:

| Cmd | Len L | Len H |
|-----|-------|-------|
| 3   | 0x00  | 0x00  |

Where:
Cmd: Command Byte = 3
Len L = 0 bytes for payload = 0
Len H = payload is less than 256, therefore = 0

The reply message to command 3 is the same as the command, with the payload appended:

| Cmd | Len L | Len H | FW Version |
|-----|-------|-------|------------|
| 3   | 0x08  | 0x00  | 8 Bytes    |

Where:
Cmd: Command Byte = 3
Len L = payload byte count low = 8
Len H = payload is less than 256, therefore = 0
FW Version = Firmware version = 4 16-bit integers. The four integers are major version, minor version, day count (e.g., days since Jan. 1, 2013), build on day count The byte stream for command 4 to set the tag ID of the 1-wire chips is as follows:

| Cmd | Len L | Len H | TagId[0-15] | Port | Port | ... |
|-----|-------|-------|-------------|------|------|-----|
| 4   | 0x11  | 0x00  | 16 Bytes    | 0-23 | 0-23 | ... |

Where:
Cmd: Command Byte = 4
Len L = 17 bytes for writing to one port, 16 bytes for Tag ID + 1 byte for port index
Len H = payload is less than 256, therefore = 0
TagID = 16 byte Tag ID to write to the 1-wire RAM
Port = The port index of a port to write to the 1-wire RAM In this example, USB Sensor Bar responds to command 4 from the device manager with a response similar to the reply message for command 2 described above.

The byte stream for command 5 to post the LED states back to the device manager is as follows:

| Cmd | Len L | Len H |
|-----|-------|-------|
| 5   | 0x00  | 0x00  |

Where:
Cmd: Command Byte = 5
Len L = 0 bytes for payload = 0
Len H = payload is less than 256, therefore = 0

The reply message to command 5 is the same as the command, with the payload appended:

| Cmd | Len L | Len H | Freq0 | Pwm0  | Freq1 | Pwm1  | L 1-4     | ... | L 21-24   |
|-----|-------|-------|-------|-------|-------|-------|-----------|-----|-----------|
| 5   | 0x0A  | 0x00  | 0-255 | 0-255 | 0-255 | 0-255 | 4 × 2 bits | ... | 4 × 2 bits |

Where:

Cmd: Command Byte = 5

Len L = 10 bytes for payload = 0x0A

Len H = payload is less than 256, therefore = 0

Freq0 = Blink Frequency Prescaler 0

Pwm0 = Blink Pulse Width Modulation 0

Freq1 = Blink Frequency Prescaler 1

Pmw1—Blink Pulse Width Modulation 1

L 1-4 = LED display states for LEDs 1 to 4

L 5-8 = LED display states for LEDs 5 to 8

L 9-12 = LED display states for LEDs 9 to 12

L 13-16 = LED display states for LEDs 13 to 16

L 17-20 = LED display states for LEDs 17 to 20

L 21-24 = LED display states for LEDs 21 to 24

Each LED state is defined by two bits as:
00: LED off
01: LED on solid
10: LED blinks at rate defined by Freq0 and Pwm0
11: LED blinks at rate defined by Freq1 and Pwm1

The byte stream for command 6 to for posting the 1-Wire serial numbers to the device manager is as follows:

| Cmd | Len L | Len H |
|-----|-------|-------|
| 6   | 0x00  | 0x00  |

Where:
Cmd: Command Byte = 6
Len L = 0 bytes for payload = 0
Len H = payload is less than 256, therefore = 0

The reply message to command 6 is the same as the command, with the payload appended:

| Cmd | Len L | Len H | P1[0-15] | ... | P24[0-15] |
|-----|-------|-------|----------|-----|-----------|
| 6   | 0xC0  | 0x00  | 8 Bytes  | ... | 8 Bytes   |

Figure 4:
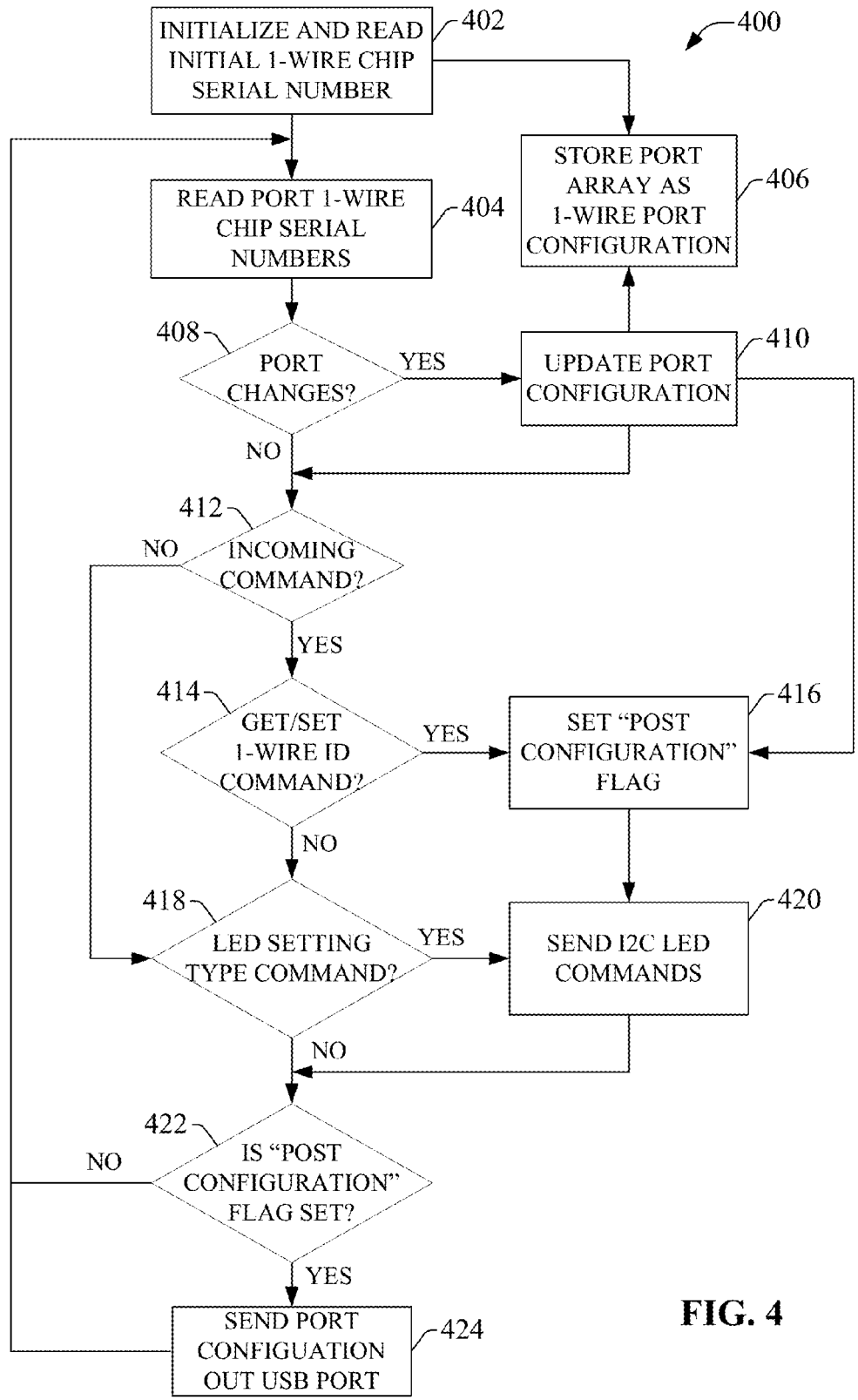
FIG. 4 illustrates an example method for reading of 1-wire chip identifiers and processing of device manger commands by a USB sensor bar.

Where:
Cmd: Command Byte = 6
Len L = payload byte count low = 192 − 0xC0
Len H = payload byte count high = 0
P1-P24 = Port 1-Wire serial number. 8 bytes × number of ports on sensor bar FIG. 4 is an example methodology that can be carried out by the USB sensor bar firmware to facilitate reading of 1-wire chip identifiers and processing of device manger commands. While, for purposes of simplicity of explanation, the methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Initially, at 402, the USB sensor bar is initialized and initial 1-wire chip serial numbers are read for any cables and/or plugs that are inserted into ports of the USB sensor bar. After this initial read operation, port array data containing the detected serial numbers of the respective 1-wire chips and the location of each serial number on the patch panel (e.g., the port number into which the 1-wire chip is inserted) is stored as a 1-wire port configuration at step 406.

After the initialization of step 402, the subsequent steps are performed during normal operation of the USB sensor bar. At 404, the 1-wire chip serial numbers are read. At 408, a determination is made regarding whether any port changes have been made since the previous reading of the 1-wire chip serial numbers. This determination can be made, for example, by comparing the port configuration read at step 404 with the port array stored at step 406. A port change can comprise insertion of a new cable plug into a port of the patch panel (and corresponding insertion of a 1-wire chip into a port of the USB sensor bar), removal of a cable plug from a port, or relocation of a cable plug to a new port.

If it is determined at 408 that a port change has been made based on the read operation of step 404, the port configuration is updated at step 410 and the new port array is stored at 406 as the new 1-wire port configuration. The methodology then proceeds to step 416, where a "post configuration" flag is set in order to indicate that the port configuration has been changed in the present cycle. Additionally, I2C LED commands are sent at step 420 to update any necessary LEDs on the USB sensor bar to reflect the new port configuration (e.g., turning on an LED associated with a port into which a new cable plug has been inserted, turning off an LED associated with a port from which a cable plug has been removed, etc.). The methodology then moves to step 422, where it is determined whether the "post configuration" flag has been set. The "post configuration" flag informs the controller 204 that the port configuration has been updated, and that the new configuration must therefore be sent to the device manager. Accordingly, since the "post configuration" flag had been set at step 416 in this instance ("Yes" at step 422), the port configuration is sent out the USB port at step 424, and the methodology returns to step 404 to perform the next read of the 1-wire chip serial numbers.

If no port changes were detected at step 408, the methodology moves to step 412, where a determination is made regarding whether an incoming command has been received from the device manager. If an incoming command has been received at step 412, a determination is made at step 414 as to whether the incoming command is a "Get 1-wire ID" command or a "Set 1-wire ID" command. The "Get 1-wire ID" command can comprise a request from the device manager to retrieve one or more 1-wire IDs stored in the port configuration, while the "Set 1-wire ID" command can be an instruction from the device manager to set a new identifier for one or more 1-wire chips. If a Get or Set command has been received, the methodology moves to step 416, where the "post configuration" flag is set, and steps 420, 422, and 424 are performed as described above in order to send the port configuration data to the device manager. In the case of a Get command, the stored port configuration is sent in its current form. In the case of a Set command, any necessary 1-wire chip identifiers are set in accordance with the received Set command prior to sending the port configuration to the device manager.

Returning to step 414, if it is determined that the incoming command is not a "Get 1-wire ID" or a "Set 1-wire ID" command, the methodology proceeds to step 418, where a determination is made regarding whether the incoming command is an LED setting type command. This can comprise a command from the device manager to turn on or off an LED indicator on the USB sensor bar, or to change a color or blink rate of an LED indicator. If the command is an LED setting type command, the methodology moves to step 420, where the appropriate I2C LED commands are sent in order to carry out the requested LED setting. The methodology then proceeds to step 422, where it is determined that the "post configuration" flag has not been set (since the LED setting type command does not require a port configuration change). Accordingly, the methodology returns to step 404 without sending the port configuration to the device manager.

Figure 5:
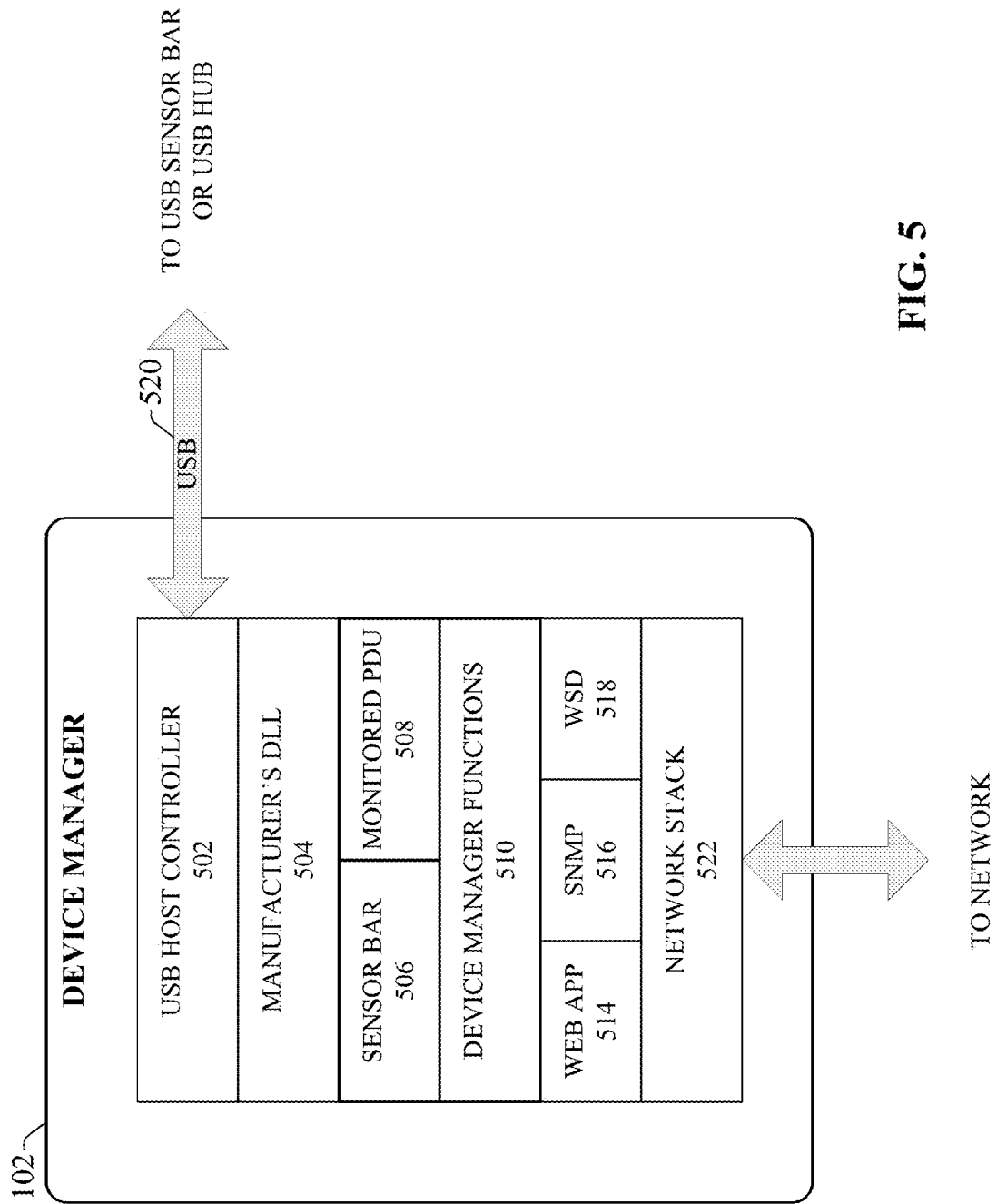
FIG. 5 illustrates a number of general functional components of an example device manager.

FIG. 5 illustrates a number of general functional components of device manager 102 according to one or more embodiments. The combination of functional components depicted in FIG. 5 is not intended to be exhaustive, and some embodiments of device manager 102 may omit one or more components depicted in FIG. 5 without deviating from the scope of this disclosure.

Device manager 102 can include a USB host controller 502 that serves as an interface between USB devices on USB bus 520 (e.g., USB sensor bar 106) and the device manager's software. USB host controller 502 can comprise the hardware and/or software that supports USB communication at the device manager's USB port. Device manager 102 can also include a manufacturer's dynamic-link library (DLL) 504, which supports the device manager's operating system and associated programs.

Network stack 522 comprises the supporting framework (e.g., protocol stacks) for communication with a network over the device manager's network port. In one or more embodiments, network stack 522 can support TCP/IP protocol; however, other protocols are also within the scope of one or more embodiments of this disclosure.

In conjunction with network stack 522, one or more of a web application component 514, a SNMP component 516, or a WSD component 518 can support communication with various types of client applications (a web application, an SNMP client application 120, or a WSD client application, respectively). Device manager 102 can leverage these components to provide network status information to client devices and applications using the respective application protocols. For example, device manager 102 can generate a graphical user interface that conveys status information for the respective ports of a USB sensor bar connected to USB bus 520, and deliver the interface to a client device via the network port using web application component 514.

Device manager 102 also comprises a number of components for managing the USB sensor bar and other components on USB bus 520, as well as processing data received from those USB devices. Sensor bar component 506 manages data exchanges between device manager 102 and USB sensor bar 106. This can include, for example, sending requests for port status data, sending sensor bar configuration data (e.g., instructions for setting a name for the USB sensor bar or individual ports thereof), or sending LED setting type instructions to the USB sensor bar. In addition, sensor bar component 506 can manage receipt of solicited and unsolicited data from the USB sensor bar.

Monitored PDU component 508 manages similar data interactions between the device manager 102 and a monitored power distribution unit that may also reside on the USB bus 520. Monitored PDUs will be discussed in more detail infra.

Device manager 102 also runs a suite of device manager functions 510. These can include such operations as processing of network status data received from one or more USB sensor bars, data collection and storage, generation of notifications or alarms in response to detection of a defined network event, and other functions to be described in more detail below.

In one or more embodiments, device manager 102 can comprise a hardware device preconfigured with some or all of the functional components illustrated in FIG. 5. Alternatively, the functions illustrated in FIG. 5 can be provided as software that can be installed on a standard computing device (e.g., a server or other computer) so that the computing device can serve as a device manager for one or more USB sensor bars.

Figure 6:
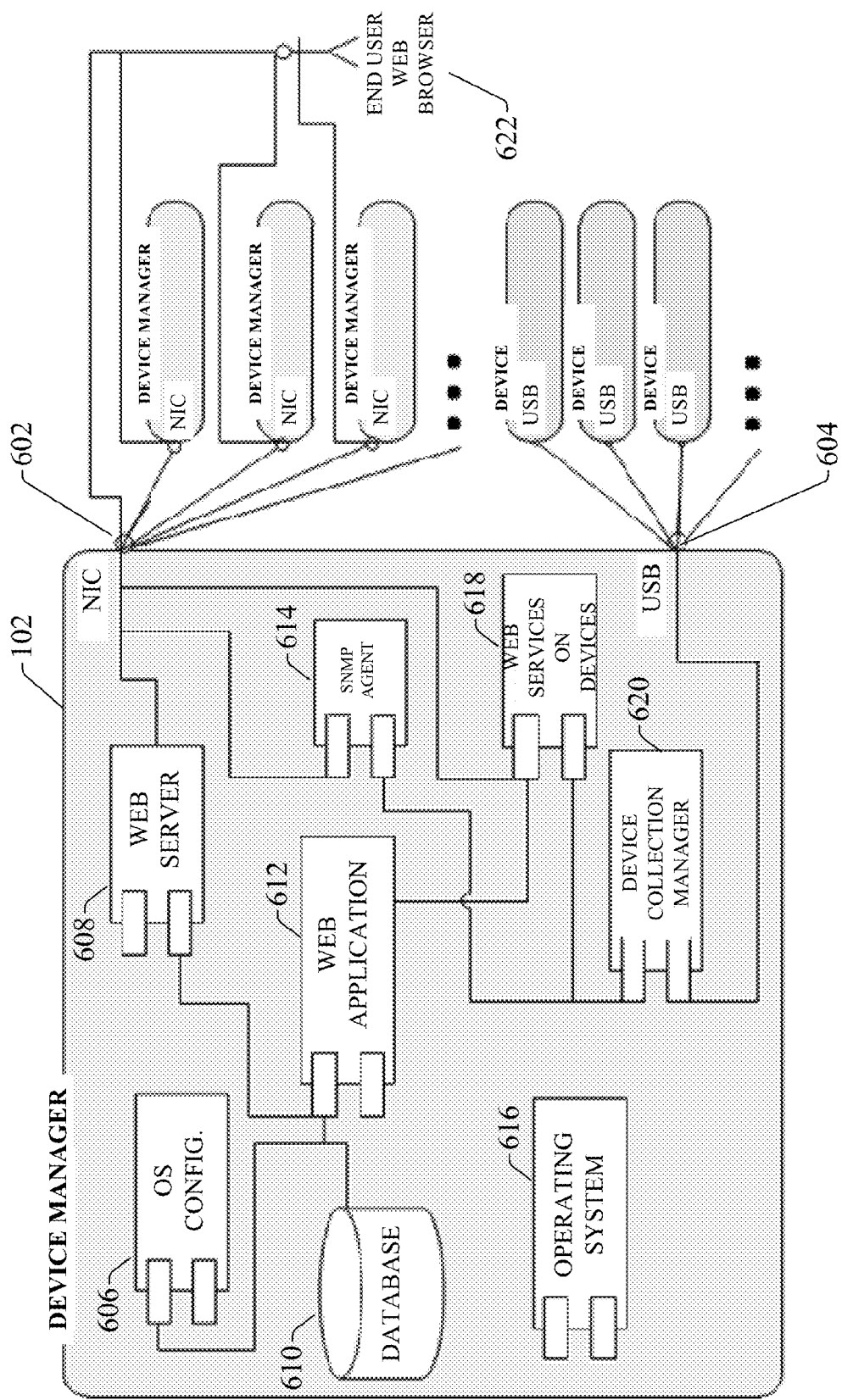
FIG. 6 illustrates system components comprising an example device manager.

FIG. 6 depicts a number of system components comprising device manager 102 according to one or more embodiments. One or more of the system components illustrated in FIG. 6 can collectively comprise a software suite (e.g., the suite of functions represented by device manager functions 510 of FIG. 5) that can be installed and executed on device manager 102 to facilitate tracking and monitoring of USB sensor bars and network branches connected thereto.

Device manager 102 includes at least one network interface card (NIC) 602 comprising a network port (e.g., an Ethernet port). NIC 602 allows device manager 102 to be placed on a network (e.g., network 112) to facilitate communication with client applications (e.g., an end user web browser 622) or with other device managers. The NIC 602 serves as a physical interface between the device manager and an end user over a network (e.g., via TCP/IP). The NIC 602 can be configured by the end user using a Dynamic Host Configuration Protocol (DHCP) server or by using a web application that interfaces with the NIC 602 and allows necessary device settings on the device manager 102 to be set by a user.

Device manager 102 also comprises at least one USB port 604 for communication with one or more USB devices. USB port 604 can interface with one or more USB sensor bars, either directly or via a USB hub (e.g., USB hub 104 of FIG. 1). USB port 604 may also communicate with a monitored power distribution unit (PDU) if such a device is present on the USB bus. Device manager 102 can discover and configure USB devices using standard USB enumeration.

Operating system 616 can comprise any suitable operating system configured with components necessary for monitoring and management of USB sensor bars by device manager 102.

Web server 608 can be used by device manager 102 to serve web pages to client devices (e.g., end user web browser 622) via NIC 602. Such web pages can include, for example, graphical displays that render network status information based on data received from the USB sensor bars, configuration pages through which a user can enter configuration settings for device manager 102 or for a USB sensor bar attached thereto, or other such interface displays.

Database 610 can be used by device manager 102 to store current and historical network status and configuration data received from the USB sensor bar. The data maintained in database 610 can be used to populate web-based user interfaces (such as those served by web server 608), perform comparisons between a current network configuration reported by the USB sensor bar and a previous network configuration stored in database 610, generate reports that map a current or previous network infrastructure, or other such functions. In some embodiments, database 610 may also store alarm and/or notification rules that define network events that will trigger delivery of a remote alarm or notification to a client device. For example, a notification rule may define that a notification should be delivered to one or more specified client devices in response to a determination that a patch cable plugged into a specified port of a specified USB sensor bar is removed. Accordingly, when device manager 102 receives port confirmation data indicating that the specified port of the specified USB sensor bar no longer has an associated 1-wire chip identifier (that is, the plug containing the 1-wire chip has been removed), the device manager 102 will refer to the notification rule, determine that this condition matches the defined notification event, and send a notification to the specified client devices via NIC 602. Device manager 102 may also log general system events to database 610. In an exemplary embodiment, database 610 can comprise a structured query language (SQL) database (e.g., SQL Server Express with Reporting Services).

Web application 612 can comprise a developed set of web pages and processes for configuration of the device manager's hardware, configuration and control of USB devices connected to the device manager (e.g., USB sensor bar 106, a monitored PDU, etc.), system change planning and control, event logging, and system reporting. Web application 612 can serve as an external facing graphical user interface for device manager 102. In one or more embodiments, web application 612 can run on an Internet Information Services (IIS) web server on device manager 102. In some embodiments, Web application 612 can use hypertext markup language (HTML), Active Server Page (ASPX), and/or Javascript scripting. Web page content and actions associated with web application 612 can use both the database 610 and the web services operations to provide content and perform configuration changes.

Figure 7:
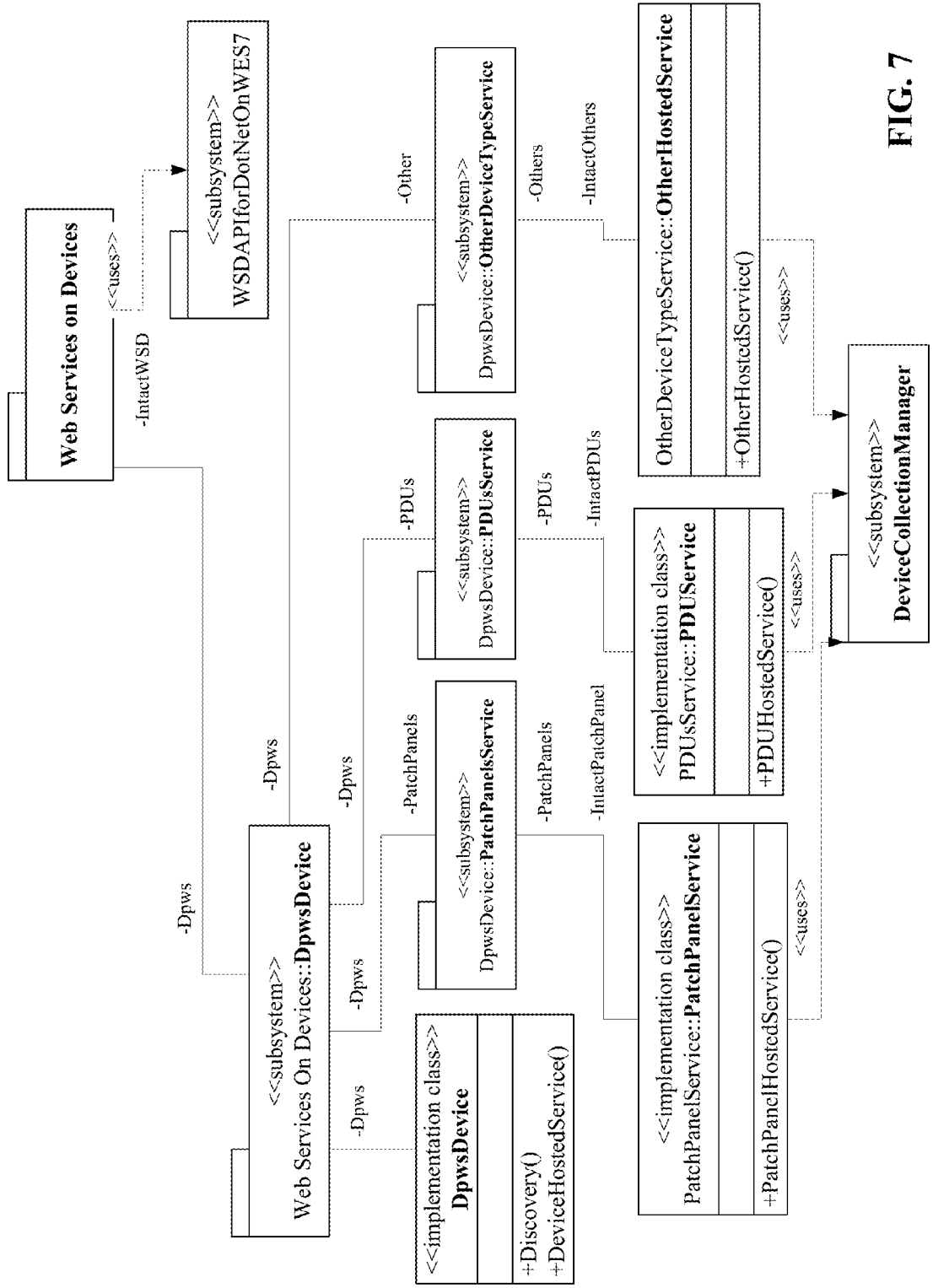
FIG. 7 illustrates a unified modeling language (UML) depiction of an example Web Services for Devices (WSD) agent that can be implemented on a USB device manager.

Web services on devices (WSD) agent 618, which can adhere to the web services on devices standards, can provide for device manager hardware discovery on the end user's network. WSD agent 618 can also provide a web service interface for configuration and control of the device manager, and a web service interface into the USB devices (e.g., USB sensor bar 106, a monitored PDU, etc.) connected to the device manager. WSD agent 618 can also provide a web service eventing interface for device manager 102 or other external applications, such as a mobile device application or other device managers on distant subnets. Device manager 102 can use WSD agent 618 to discover other device managers on local and remote subnets, thereby allowing a user to see all connected devices through a web application interface associated with any one of the device managers. FIG. 7 is an exemplary, non-limiting UML depiction of the WSD agent 618. The WSD binary can be a WSD device for WSD discovery, and can host the DeviceManager service for device manager level operations.

In one or more embodiments, device manager 102 can also implement a SNMP agent 614, which can adhere to SNMP protocol and provides for device manager hardware discovery on the end user's network. SNMP agent 614 also provides an SNMP interface for configuration of the device manager 102, as well as an SNMP interface for devices connected to the device manager 102. SNMP agent 614 can also provide management information base (MIB) data for MIB browsers and legacy systems for viewing of USB devices and their configuration.

Figure 8:
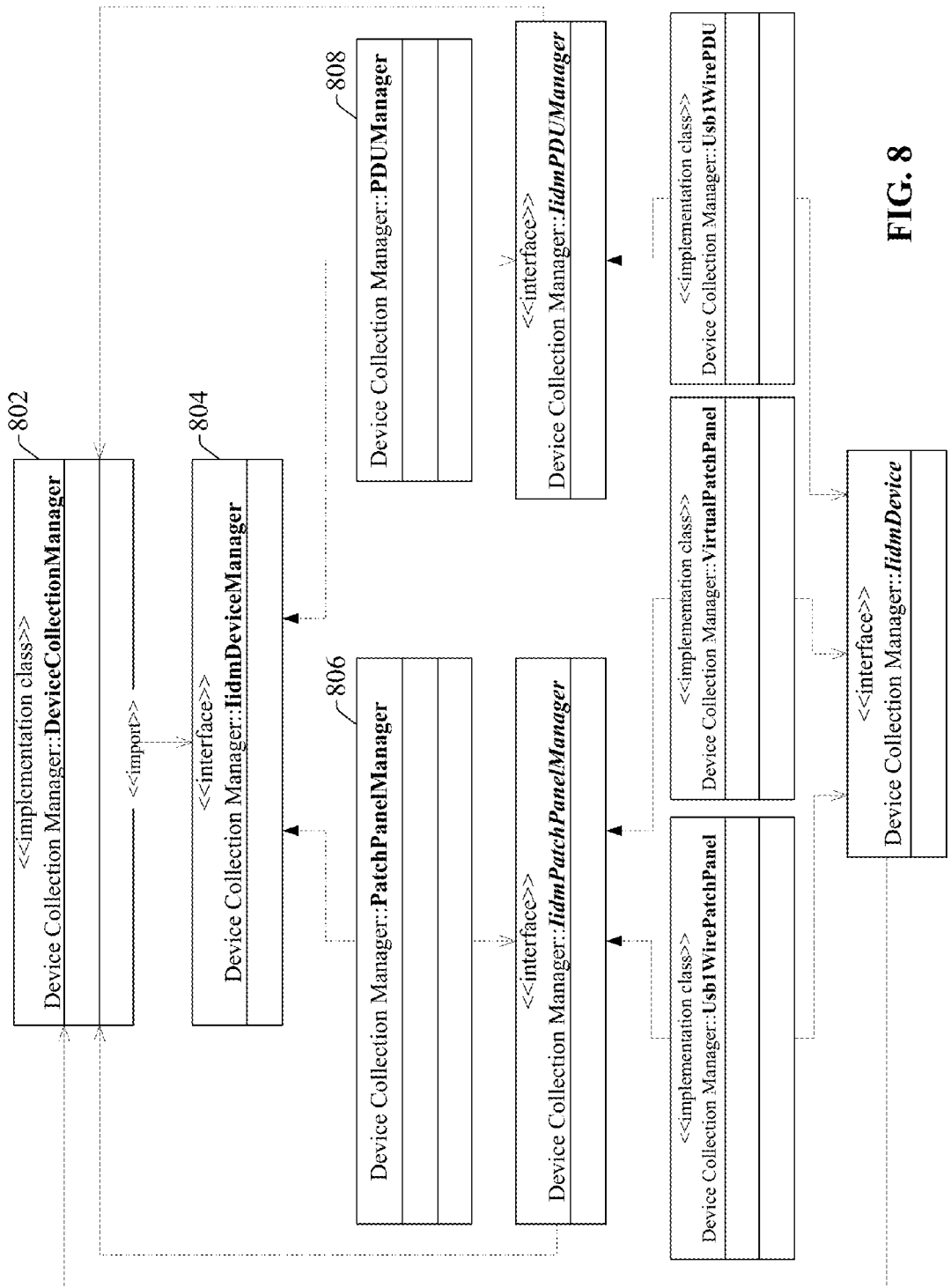
FIG. 8 illustrates a UML depiction of a device collection manager abstract factory that can be implemented on a device manager.

Referring back to FIG. 6, device collection manager 620 can provide a generic interface between USB devices connected to device manager (e.g., USB sensor bars, monitored USB PDUs, etc.) and the web services interface that the web application 612 and WSD agent 618 consume. Device collection manager 620 can manage data from devices (e.g., USB sensor bars, monitored PDUs, etc.) that are connected to device manager 102 over the USB bus. Device collection manager 620 populates the device manager's database 610 and provides an interface between web services and SNMP components to access the data. Device collection manager 620 can pass the data upstream to the web application, SNMP agent, or external devices. In some embodiments, device collection manager 620 can implement an abstract factory design pattern to provide a "plug-in" approach to managing multiple device types, and can collect downstream device data from attached devices and from other device managers. FIG. 8 is an exemplary, non-limiting UML depiction of the device collection manager abstract factory. In this example, the DeviceConnectionManager class 802 is an Abstract Factory that builds a list of all the currently connected devices. Each object in the collection implements the interface IidmDevice. The IidmDeviceManager interface 804 is implemented by device type managers to build device managers of their respective device types. The Device Manager collection is dynamically filled by loading all manager DLLs in a device factory folder. Each device manager implements an interface of the type of device manager it is producing (e.g., a Patch Panel device manager 806 or a PDU device manager 808). The device manager collection is populated by dynamically loading all device type manager DLLs in a device folder.

Figure 9:
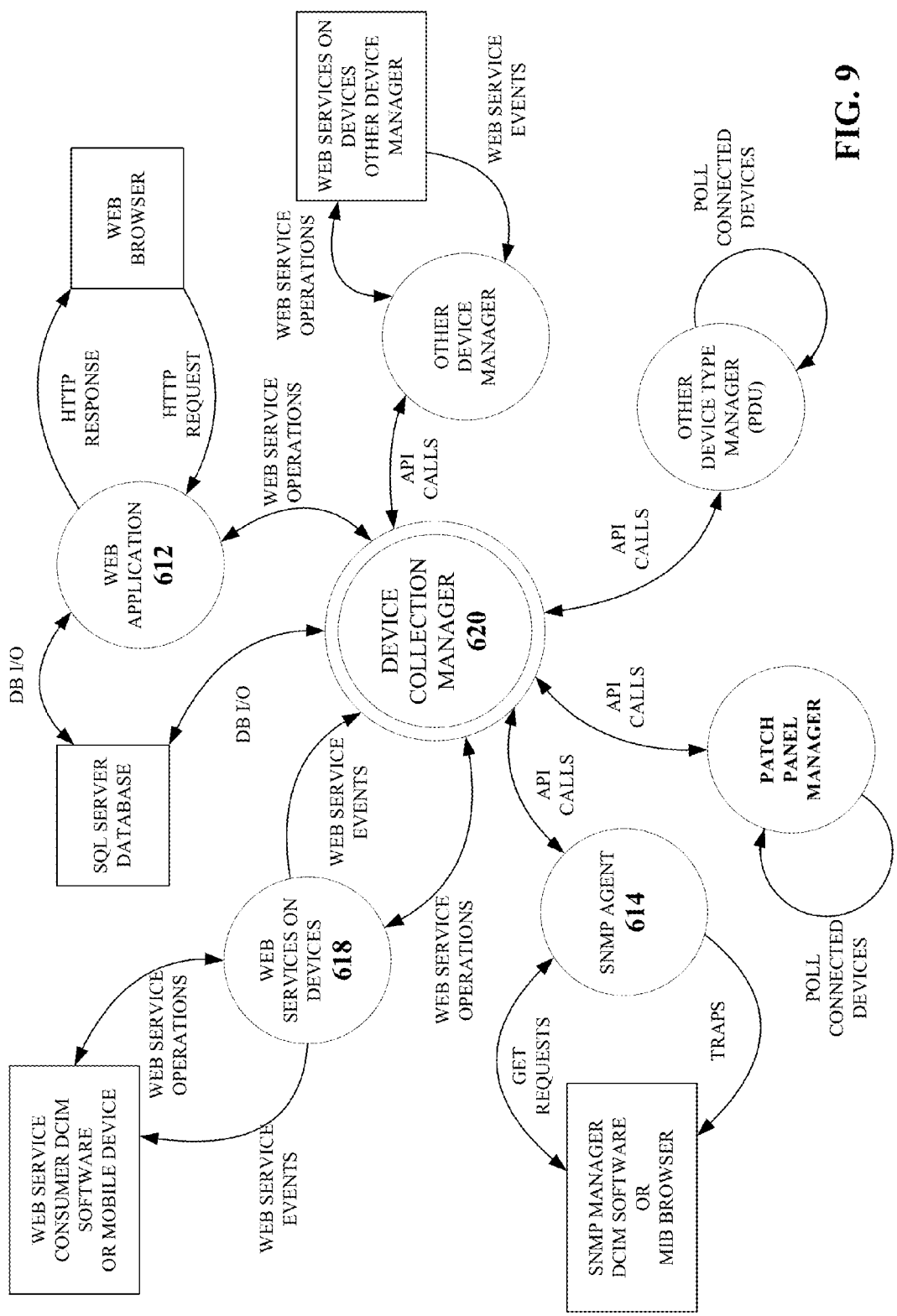
FIG. 9 is a flow diagram illustrating an exemplary flow of data through the various system components of a device manager.

FIG. 9 is a flow diagram illustrating an exemplary flow of data through the various system components of device manager 102 according to one or more embodiments. At startup, device collection manager 620 loads the locally configured device managers. Each device manager is continually monitoring its connected devices for status and makes the data available to the device collection manager core. In addition to the local device managers, device collection manager 620 monitors other device managers through the WSD interface to collect the device information for all devices locally connected to their respective device managers, thus allowing any device manager to provide device data for all devices in a system.

The WSD agent 618 and SNMP agent 614 are connected persistently to the device collection manager 620 in order to respond to any received request, and/or to send events. Requests for device status for any customer facing interface, such as web application 612 or DCIM software, can be made through the WSD or SNMP interface.

Figure 10:
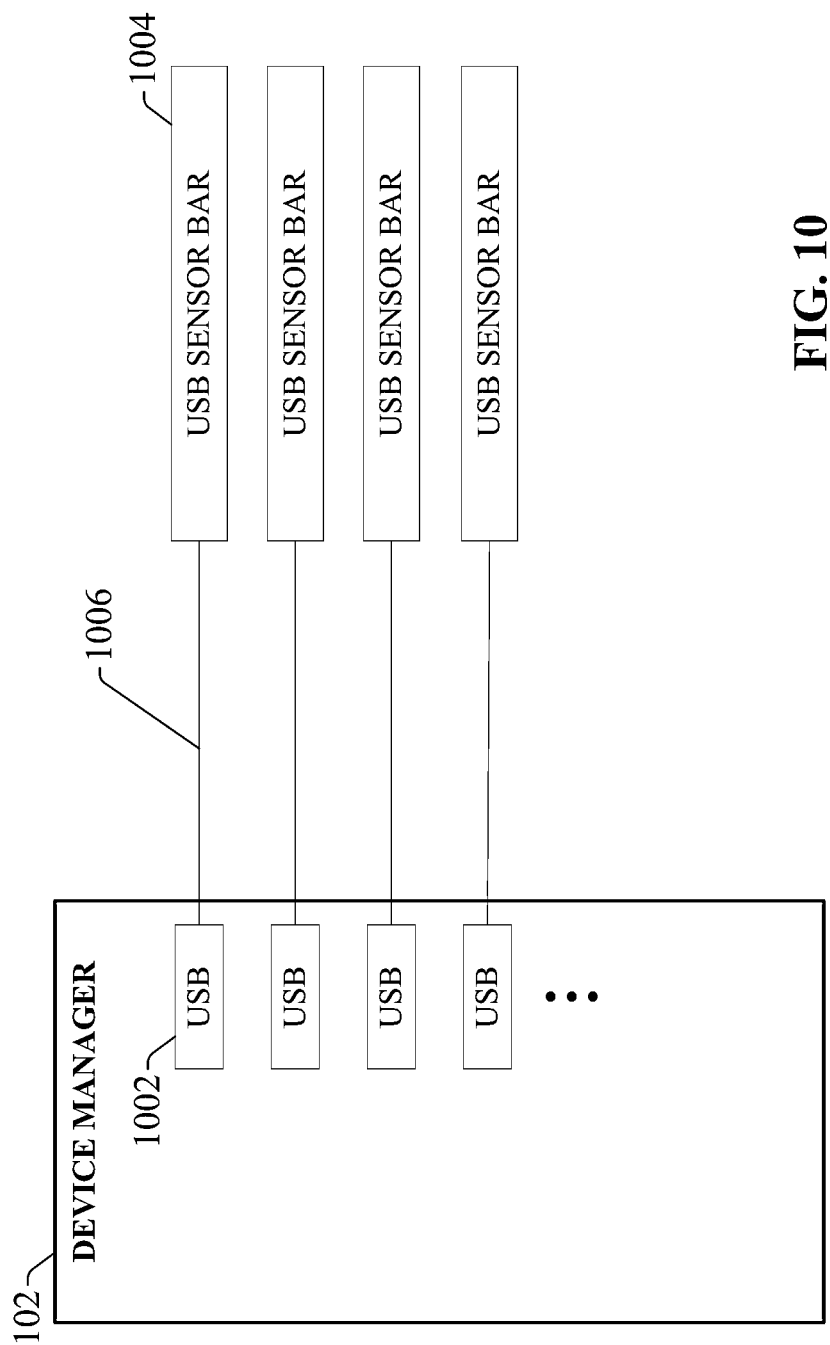
FIG. 10 illustrates an example configuration wherein a number of USB sensor bars are directly connected to USB ports of a device manager.
Figure 11:
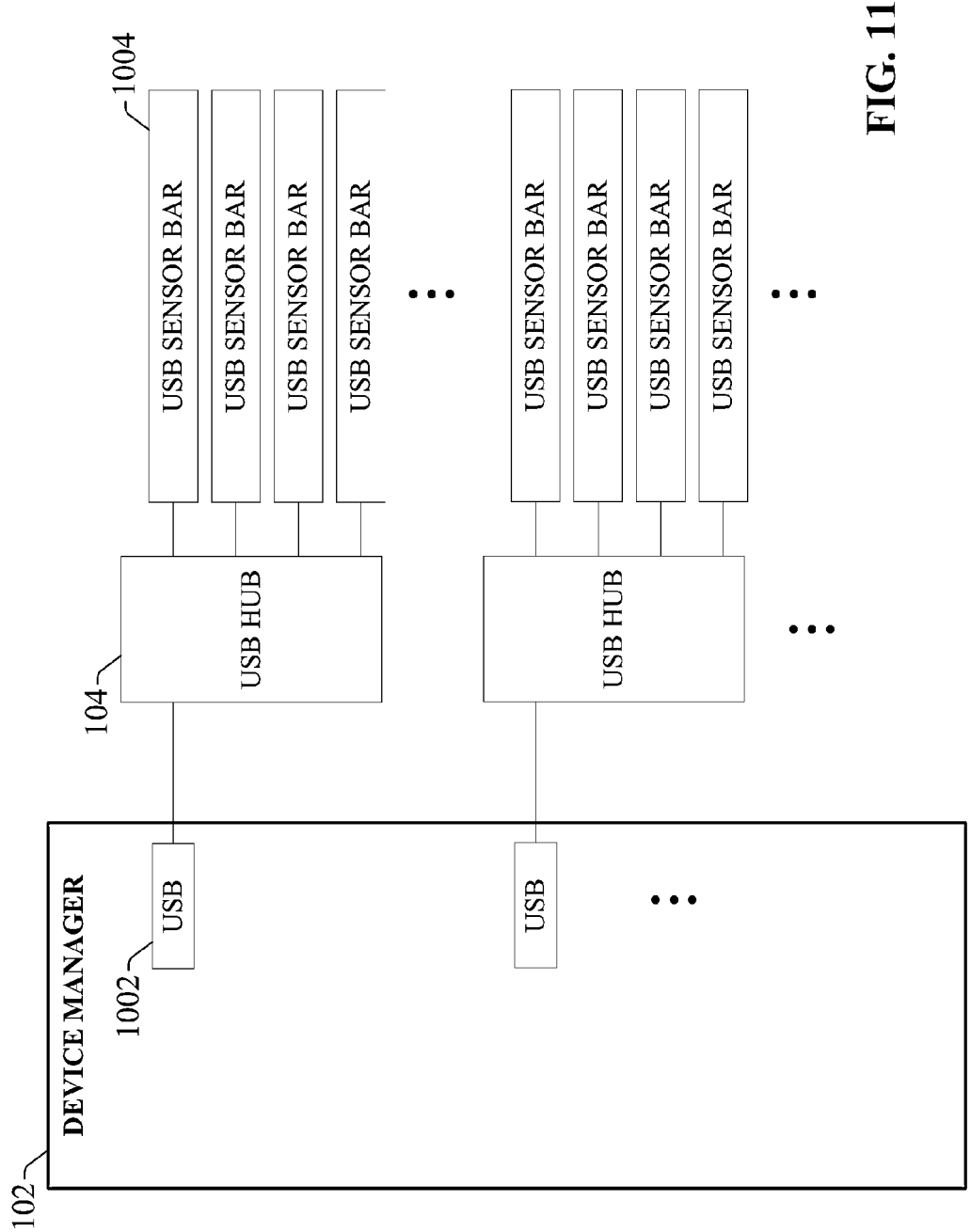
FIG. 11 illustrates an example configuration that utilizes USB hubs to increase the number of USB sensor bars that can be connected to a device manager.
Figure 12:
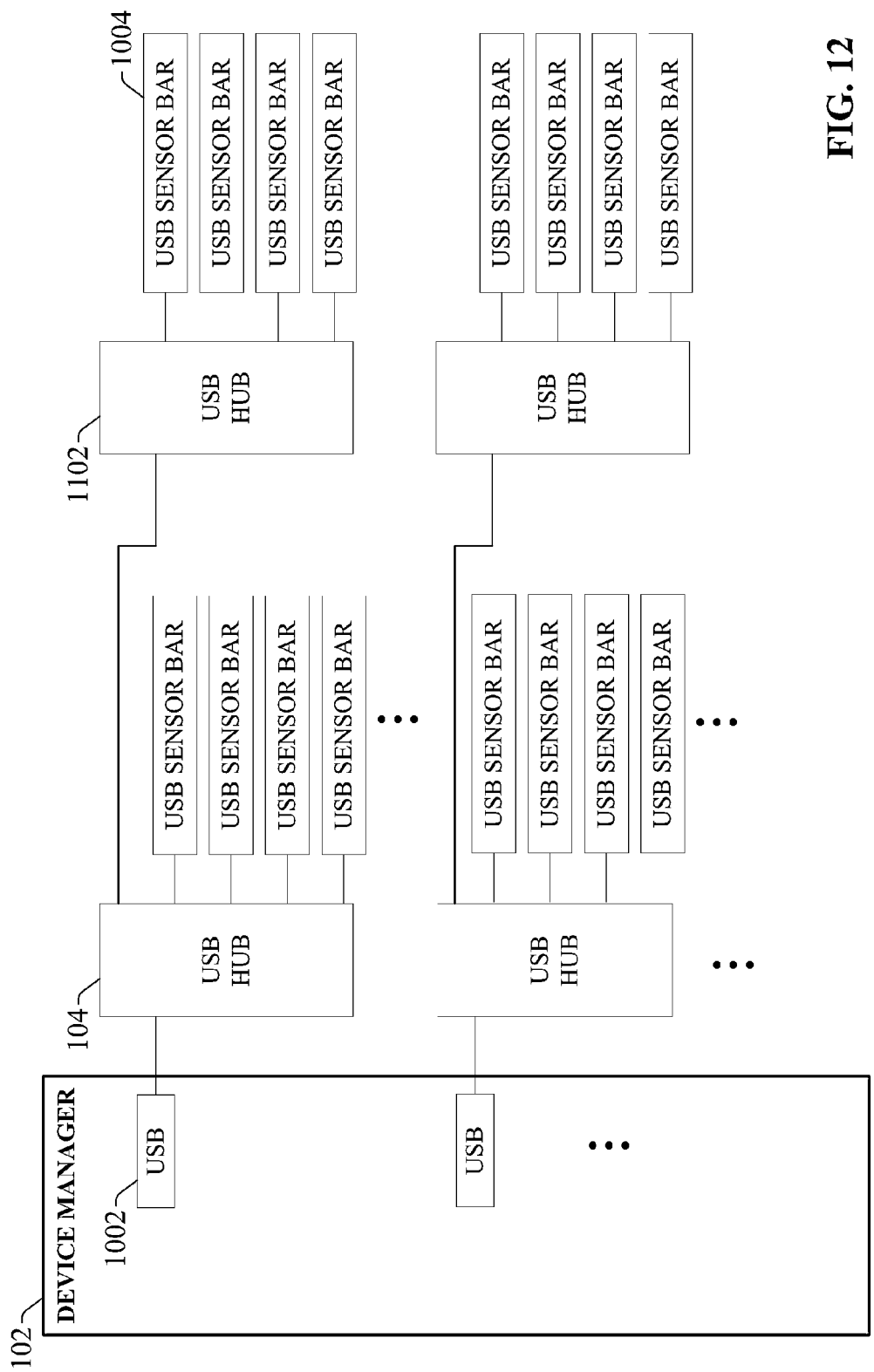
FIG. 12 illustrates a configuration that further increases the number of USB sensor bars that can be connected to a device manager.

FIGS. 10-12 illustrate a number of exemplary system configurations for the device manager and USB sensor bars according to one or more embodiments. FIG. 10 illustrates a configuration wherein a number of USB sensor bars 1004 are directly connected to USB ports 1002 of device manager 102 using USB cables 1006. This configuration allows device manager 102 to interface with a number of USB sensor bars 1004 equal to a number of USB ports 1002 available on device manager 102.

FIG. 11 illustrates a configuration that utilizes USB hubs 104 to increase the number of USB sensor bars 1004 that can be connected to device manager 102. In this example, upstream ports of each USB hub 104 are connected directly to one of the device manager's USB ports 1002. Downstream ports of each USB hub are respectively connected to one of the USB sensor bars 1004. Assuming N available USB ports on device manager 102 and M available ports on each USB hub 104, this configuration can support a number of USB sensor bars 1004 equal to (N×M).

FIG. 12 illustrates a configuration that further increases the number of USB sensor bars 1004 that can be connected to device manager 102. Similar to the configuration depicted in FIG. 10, upstream ports of each USB hub 104 are connected directly to one of the device manager's USB ports 1002. In addition, one upstream port of each USB hub 104 is connected to the downstream port of another USB hub 1102, leaving the remaining upstream ports available to interface with a USB sensor bar 106 (not shown). This configuration can support a number of USB sensor bars 1004 equal to (N×(2M−1)).

Figure 13:
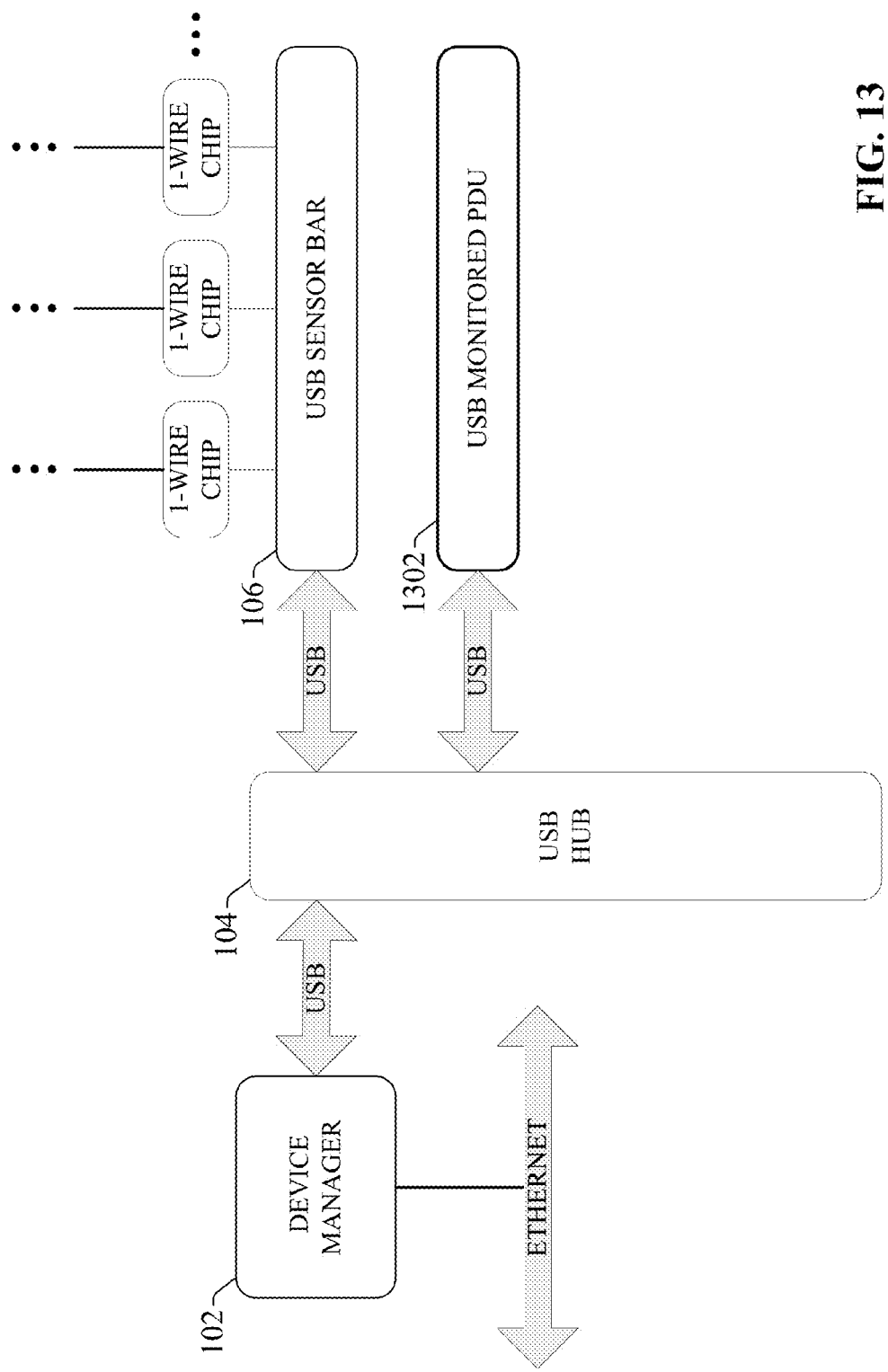
FIG. 13 illustrates a patch panel monitoring system that includes a monitored powered distribution unit on a USB bus.

In addition to USB sensor bar 106, some embodiments of device manager 102 may also support monitoring of a USB power distribution unit (PDU). FIG. 13 illustrates an exemplary system that includes a monitored PDU 1302. Similar to USB sensor bar 106, monitored PDU 1302 can interface with device manager 102 over a direct USB connection, or via a USB hub 104. Monitored PDU 1302 can distribute power to one or more USB devices on the USB network (e.g., USB sensor bars or other devices). Additionally, monitored PDU 1302 can provide statistical data to device manager 102 over the USB bus. Data provided by monitored PDU 1302 can include, for example, measured load, measured humidity, measured temperature, internal power supply faults, or other statistics.

Figure 14:
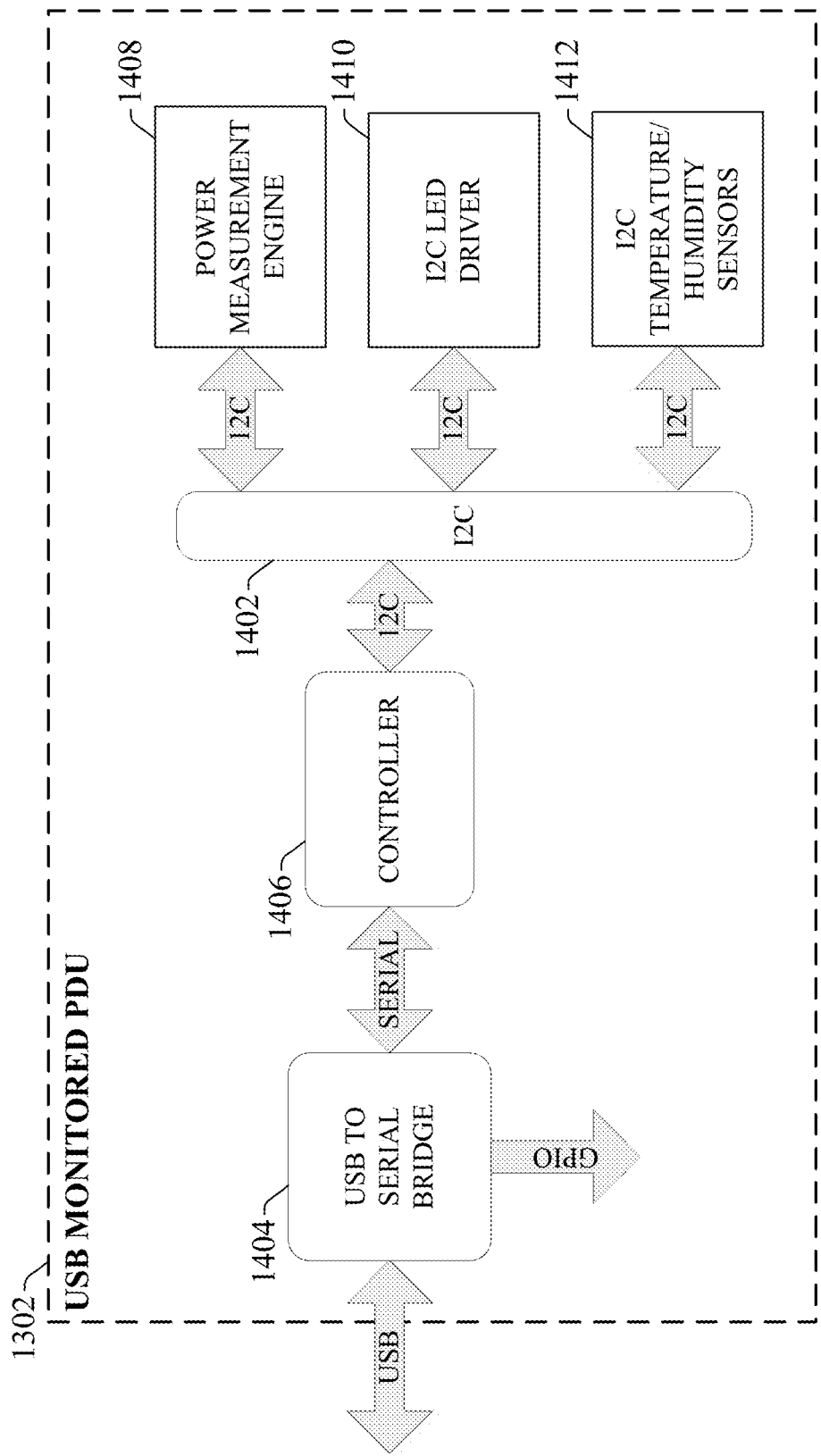
FIG. 14 illustrates a number of functional components of a monitored USB-capable power distribution unit.

FIG. 14 illustrates a number of functional components of an example monitored PDU 1302. Similar to USB sensor bar 106, monitored PDU 1302 can comprise a controller 1406 that facilitates reading data for delivery to the device manager. However, rather than reading cable identification data from a 1-wire chip, controller 1406 reads data generated by internal components of the monitored PDU 1302. Such components can include, for example, one or more of a power measurement engine 1408 that measures power statistics for the PDU (e.g., a current load on the PDU's power supply, an amount of available power, a current draw, etc.), an I2C LED driver 1410 that controls on/off and blinking states for the LEDs associated with the PDU, and one or more I2C temperature or humidity sensors 1412. Controller 1406 can read data from these or other components on I2C bus 1402.

Controller 1406 can buffer data read from components 1408, 1410, and/or 1412 and send the data to the device manager over the USB bus via USB to Serial bridge 1404. In the example illustrated in FIG. 14, the link between controller 1406 and USB to Serial bridge 1404 is depicted as a serial connection (e.g., serial with system management bus). For such systems, controller 1406 can convert the buffered data from I2C protocol to serial protocol and send the converted data to the USB to Serial bridge 1404 for delivery to the device manager. However, any suitable protocol may be used for the link between controller 1406 and bridge 1404, including but not limited to a serial bus or I2C.

Monitored PDU 1302 may also receive control and request messages from the device manager via the USB bus, including but not limited to control messages to I2C LED driver 1410 for setting a state and/or blink rate of an LED, requests for data collected by power measurement engine 1408 or temperature and humidity sensors 1412, etc.

Operation of the various PDU components illustrated in FIG. 14 may be controlled by firmware that executes on controller 1406. For example, in one or more embodiments, the firmware may continually monitor the I2C components (e.g., power measurement engine 1408, I2C LED driver 1410, and/or temperature and humidity sensors 1412) for events that merit notification Such events can include, for example, e.g., an overheat condition detected by a temperature sensor, a low power condition, a high humidity condition, etc. In response to detection of such an event, controller 1406 can send a message via the USB interface to the device manager. This configuration can mitigate the need for the device manager to ping the monitored PDU 1302 periodically for port connectivity updates. Instead, monitored PDU only sends notifications to the device manager in response to alarm or notification conditions detected at the PDU.

To facilitate management of multiple monitored PDUs by the device manager, monitored PDU 1302 can have an associated identification number or character string that can be read and tracked by the device manager. In some embodiments, the identification number can be set using a programming tool that interfaces with the USB to Serial bridge 1404 via the PDU's USB interface. The identification number or character string can be saved to non-volatile memory on the USB to serial bridge 1404 and set as the PDU identifier.

Figure 15:
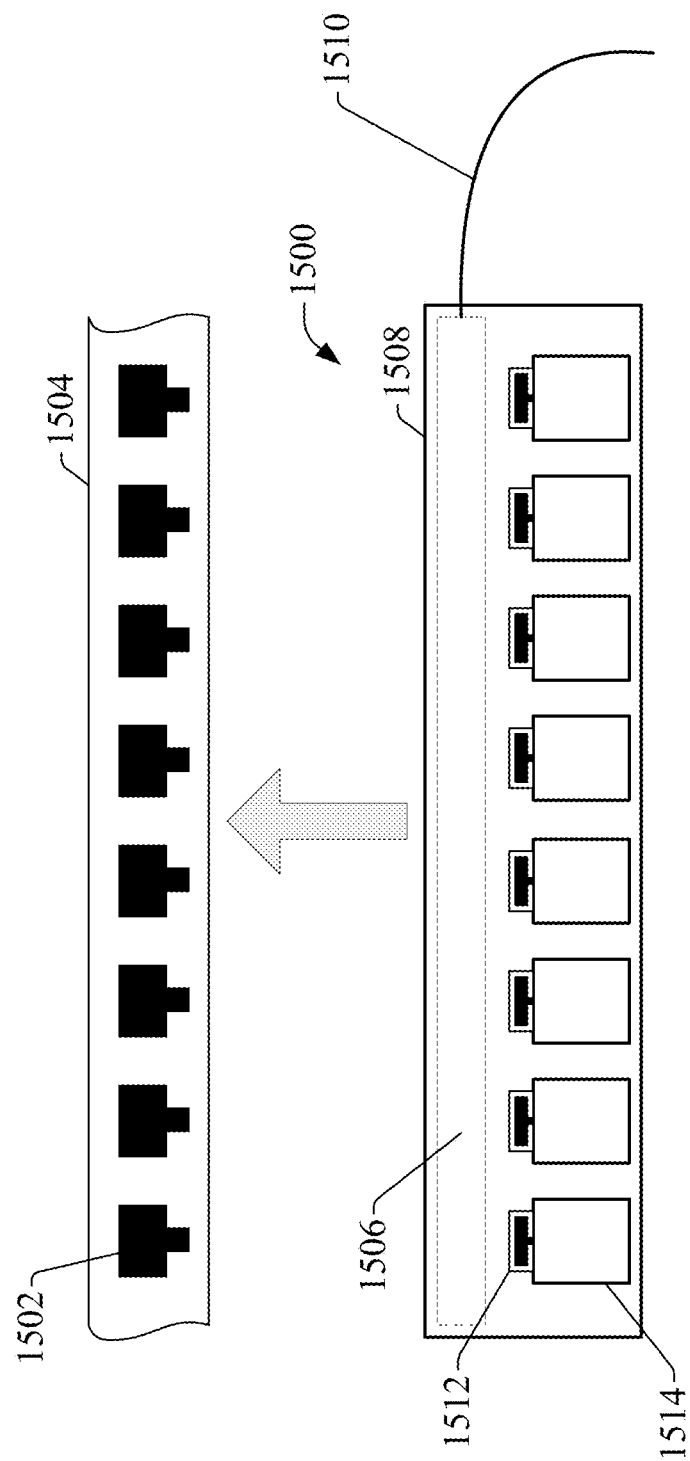
FIG. 15 illustrates an example retrofittable USB sensor bar overlay that can be mounted over a port array of a patch panel.
Figure 16:
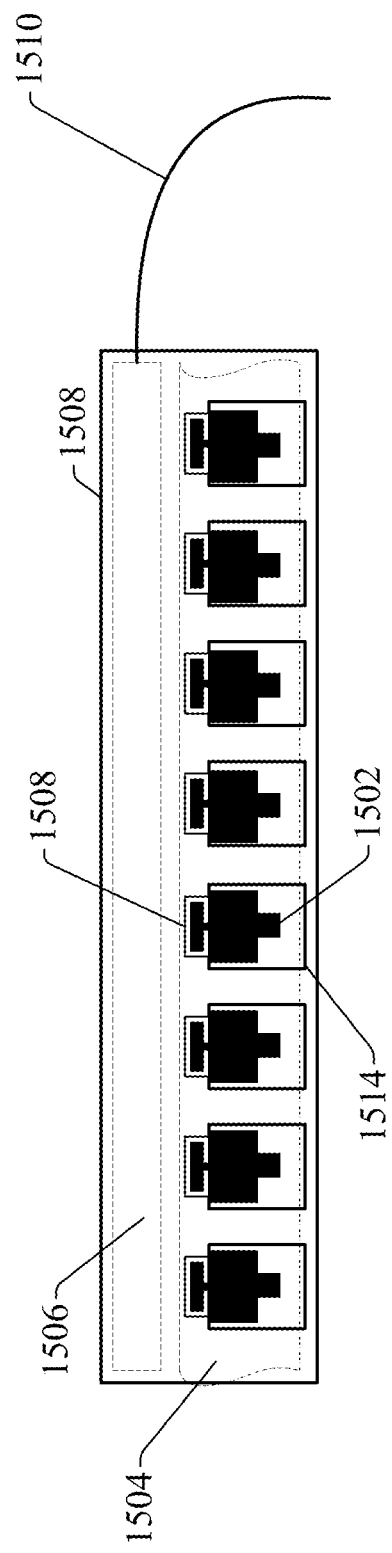
FIG. 16 depicts a retrofittable USB sensor bar overlay mounted to the front of a patch panel.

Embodiments of the USB sensor bar described herein can be provided as an integrated component of a patch panel; e.g., pre-installed behind a front face of the patch panel's housing such that the 1-wire memory chip ports are located above or below their corresponding patch cable ports. In this manner, a 1-wire memory chip fitted on a patch cable plug will be inserted into the data read port of the USB sensor bar when the cable plug is inserted into the patch panel port. In other embodiments, the USB sensor bar can be provided as a retrofittable component that can be overlaid on the front face of a standard patch panel, thereby converting the unmonitored patch panel to an intelligent panel that supports port sensing in conjunction with a device manager, as described above. FIGS. 15 and 16 illustrate an example retrofittable USB sensor bar overlay 1500. While the example illustrated in FIGS. 15 and 16 depict a USB sensor bar overlay for a copper patch panel (e.g., panels designed to receive registered jack connectors), versions of the retrofittable overlay that are compatible with fiber enclosures are also within the scope of one or more embodiments of this disclosure.

Retrofittable USB sensor bar overlay 1500 can comprise an overlay panel 1508 designed to mount to the front of a patch panel 1504. USB sensor bar circuitry 1506 can be mounted to the back of overlay panel 1508, and can comprise the sensing technology and other USB sensor bar components necessary for reading 1-wire memory chip data from 1-wire ports 1512, which are located on the front of overlay panel 1508. For example, USB sensor bar circuitry 1506 can comprise one or more of I2C to 1-wire converter 208, I2C LED driver 210, I2C bus 206, controller 204, and USB to Serial Bridge 202 (see FIG. 2). USB sensor bar circuitry 1506 can also include a USB cable 1510 attached to the USB to Serial Bridge 202. USB cable 1510 can be plugged into the USB port of a device manager (e.g., device manager 102 of FIG. 1) or a USB hub connected to the device manager (e.g., USB hub 104 of FIG. 1).

When overlay panel 1508 is mounted to patch panel 1504, windows 1514 in the overlay panel 1508 allow patch cable plugs to pass through for insertion into patch panel ports 1502. If the plugs have been fitted with a 1-wire memory chip for plug identification, the 1-wire memory chips will be inserted into 1-wire ports 1512 on the front of overlay panel 1508. Sensing technology on the USB sensor bar circuitry 1506 can then read the identification data on the respective 1-wire chips via the 1-wire ports 1512. FIG. 16 depicts the retrofittable USB sensor bar overlay mounted to the front of patch panel 1504, thereby outfitting patch panel 1504 for intelligent monitoring by a device manager as described above.

Figure 17:
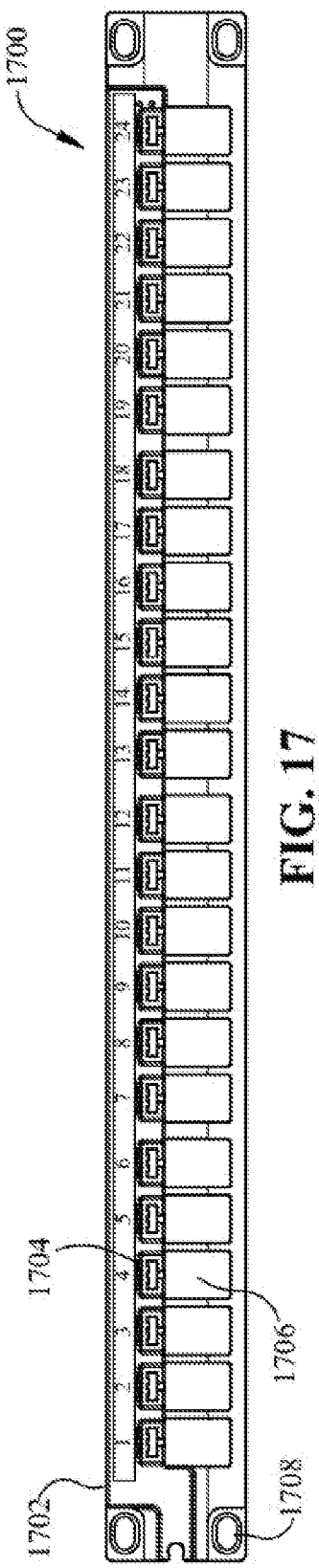
FIG. 17 illustrates an example retrofittable USB sensor bar for a copper patch panel.
Figure 18:
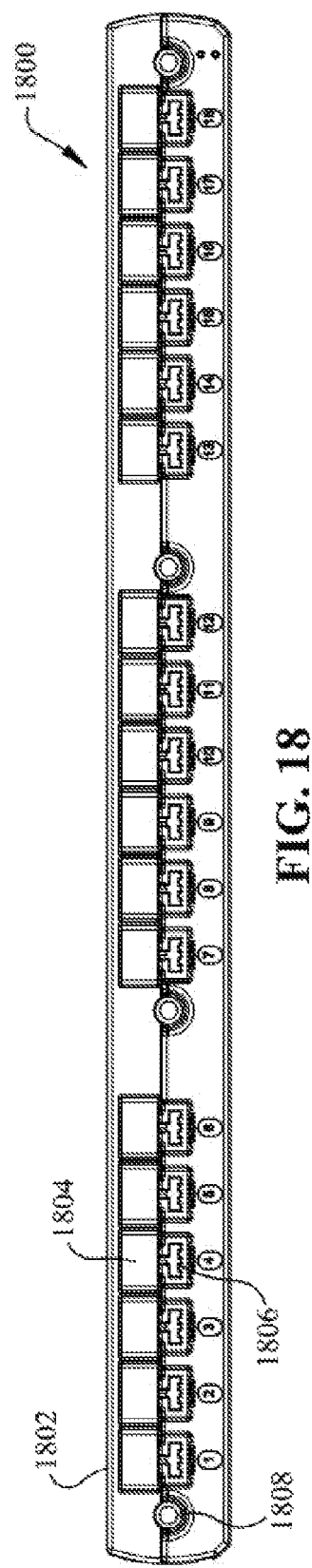
FIG. 18 illustrates an example retrofittable USB sensor bar for a fiber enclosure.

FIGS. 17 and 18 illustrate two example retrofittable USB sensor bars that are compatible with copper patch panels and fiber enclosures, respectively. FIG. 17 illustrates an example retrofittable USB sensor bar 1700 for a copper patch panel, comprising an overlay panel 1702 having a row of patch panel port windows 1706. Each of the port windows 1706 has an associated 1-wire chip port 1704 for reading a 1-wire memory chip mounted to a plug of a copper cable (e.g., CAT-6 patch cables with registered jack connectors). Retrofittable USB sensor bar 1700 can be mounted to the front of patch panel using mounting holes 1708. In one or more embodiments, windows 1706 and their corresponding 1-wire chip ports 1704 will have a fixed spacing, corresponding to a standard patch panel port spacing. In some alternative embodiments, overlay panel 1702 may be designed to allow each window and its respective 1-wire chip port to slide horizontally within the overlay frame, providing flexible compatibility with patch panels having non-standard port spacing. In such embodiments, sensing electronics associated with each movable port can be installed on respective daughter boards attached to the ports. The daughter boards can be connected to a main motherboard containing the controller and USB to Serial Bridge. This configuration can allow flexible re-positioning of individual windows on the frame.

FIG. 18 illustrates an example retrofittable USB sensor bar 1800 for a fiber enclosure. Similarly to the copper patch panel overlay depicted in FIG. 17, retrofittable USB sensor bar 1800 comprises an overlay panel 1802 having windows 1804 that fit over fiber optic cable ports of a fiber enclosure, and 1-wire memory chip ports 1806 configured to receive 1-wire memory chips mounted to the jacks of the respective fiber optic cables. Mounting holes 1808 are used to affix retrofittable USB sensor bar 1800 to the front face of the fiber enclosure.

The retrofittable USB sensor bars described herein can be used to upgrade standard (non-intelligent) copper panels and fiber enclosures to intelligent panels/enclosures by addition of the above-described overlay panels, which include the necessary sensing electronics controllers, and USB ports. For rack-mounted panels, the upgrade can be accomplished without removing the panel from the rack or cabinet. Moreover, the upgrade can utilize the existing copper or fiber cabling on the back side of the panel/enclosure with minimal or no changes. On the front side, patch cables can be retrofitted with 1-wire chip holders in order to convert the standard patch cables into intelligent patch cables compatible with the upgraded intelligent patch panel. Example 1-wire chip holders will be described in more detail below.

Although the retrofittable USB sensor bars described above include 1-wire memory chip ports for reading the cable identification data, some versions of the retrofittable USB sensor bars can support other types of identification sensing. For example, some versions of the USB sensor bar may include RFID tag readers, rather than 1-wire chip ports, associated with each cable port, thus supporting intelligent patch cables that are fitted with RFID tags rather than 1-wire memory chips. Similar to the 1-wire chips described above, each RFID tag can be written with cable identification data that uniquely identifies each cable plug, and this identification data can be read from the RFID tags by the RFID tag readers when the cable is inserted into a port fitted with the USB sensor bus.

Designing the sensor bars (both retrofittable and pre-integrated) as USB devices offers a number of benefits. For one, the number of USB sensor bars monitored by a single device manager is easily scalable (see, e.g., FIGS. 10-12). Also, USB devices can be auto-detected upon connection to or disconnection from the USB bus. USB sensor bars also support plug-and-play capability, since USB devices are automatically assigned a bus address. Moreover, power to the sensing electronics of the retrofittable USB sensor bar can be provided via the USB bus (e.g., by a monitored PDU plugged into a shared USB hub). Various embodiments of the USB sensor bars (both pre-integrated and retrofittable) described above can integrate physical port security (e.g., in the form of secure registered jack or Lucent connector products, such as mechanical port lock or plug lock devices) with electronic port monitoring by virtue of the USB interface to the device manager.

The system described herein also allows multiple device types to be added to the same USB bus for monitoring and/or management by the device manager. For example, in addition to the USB sensor bars and monitored PDUs described above, other USB devices can include standalone power meters, telemetry devices (e.g., temperature sensors, humidity sensors, airflow meters, air quality measurement devices, leak detection sensors, smoke detection sensors, etc.), lighting controls, or other such devices. These devices may include USB ports for interfacing with the shared USB bus, and for exchanging data with the device manager and other USB devices. In some embodiments, these other USB device types can include integrated I2C busses, controllers, and USB to Serial bridges similar to those found in USB sensor bar 106 and monitored PDU 1302 described above. Accordingly, corresponding embodiments of device manager 102 can include software components that support data communication, monitoring, management, and reporting functions for these other types of USB devices, allowing many different types of USB devices to be collectively monitored and managed under a single comprehensive platform.

Also, some embodiments of the USB sensor bar can support dual validation, such that both intelligent patch cables fitted with 1-wire chips and non-intelligent patch cables can be detected. As an example, the USB sensor bar can detect non-intelligent cables using a mechanical shorting function associated with each port. This detection function can work in conjunction with the 1-wire reader functions described above so that both intelligent and non-intelligent cables can be detected.

FIGS. 19-24 illustrate a first example 1-wire chip reader design that can be included in either of the retrofittable or pre-integrated versions of the USB sensor bar, and a design for a corresponding 1-wire chip holder for an intelligent patch cable. This example depicts the 1-wire reader design in the context of a retrofittable USB sensor bar. However, a similar design can be used in an intelligent patch panel having a pre-integrated USB sensor bar for reading identification data from intelligent patch cables.

Figure 19:
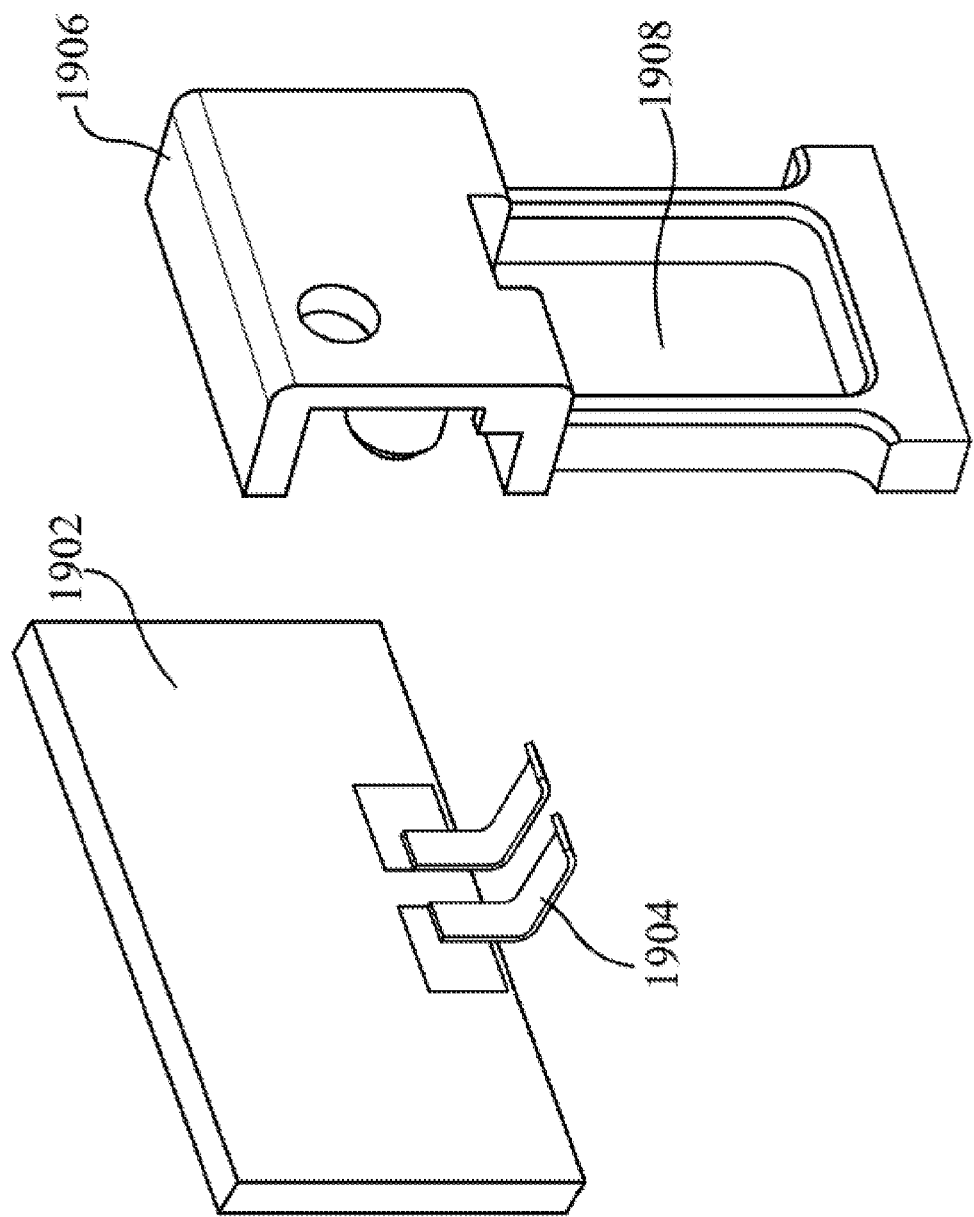
FIG. 19 illustrates a portion of a printed circuit board comprising a USB sensor bar, and a corresponding portion of an overlay panel.

FIG. 19 illustrates a portion of a printed circuit board 1902 comprising the USB sensor bar, and a corresponding portion of an overlay panel 1906 (similar to overlay panel 1508 or 1702). The illustrated portions correspond to a single 1-wire chip reader associated with a corresponding cable port. Overlay panel 1906 mounts to the front of a standard (non-intelligent) patch panel (not shown) such that window 1908 is positioned over a port of the patch panel.

Figure 20:
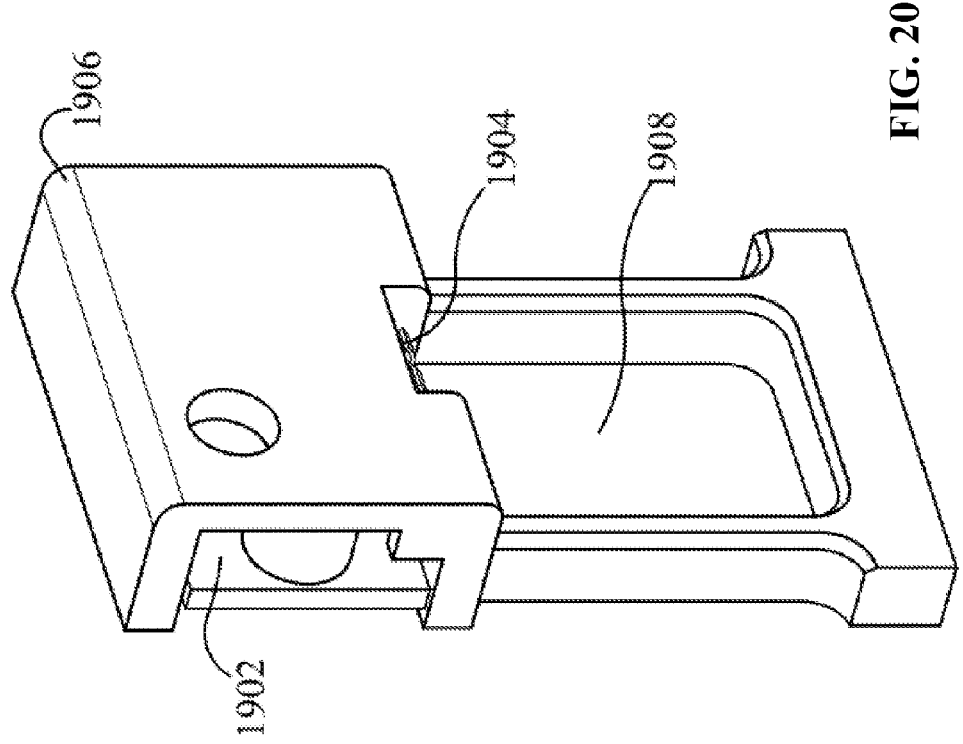
FIG. 20 illustrates a printed circuit board containing sensing circuitry mounted inside an overlay panel.

Two curved contacts 1904 are physically and electrically connected (e.g., soldered) to printed circuit board 1902 and wired to corresponding sensing circuitry (e.g., I2C to 1-wire converter 208, I2C bus 206, controller 204, etc.). The printed circuit board 1902 with attached contacts 1904 mounts inside overlay panel 1906 such that the contacts 1904 are located above window 1908, as shown in FIG. 20. When the overlay panel 1906 is mounted to the front of a patch panel, the two contacts 1904 are located above the receptacle in which the plug is received, such that when the plug is inserted into the receptacle, two contact pads of the 1-wire chip affixed to the plug make contact with the two contacts 1904, respectively, so that the identification data can be read from the 1-wire chips using sensing circuitry on the printed circuit board.

Figure 21:
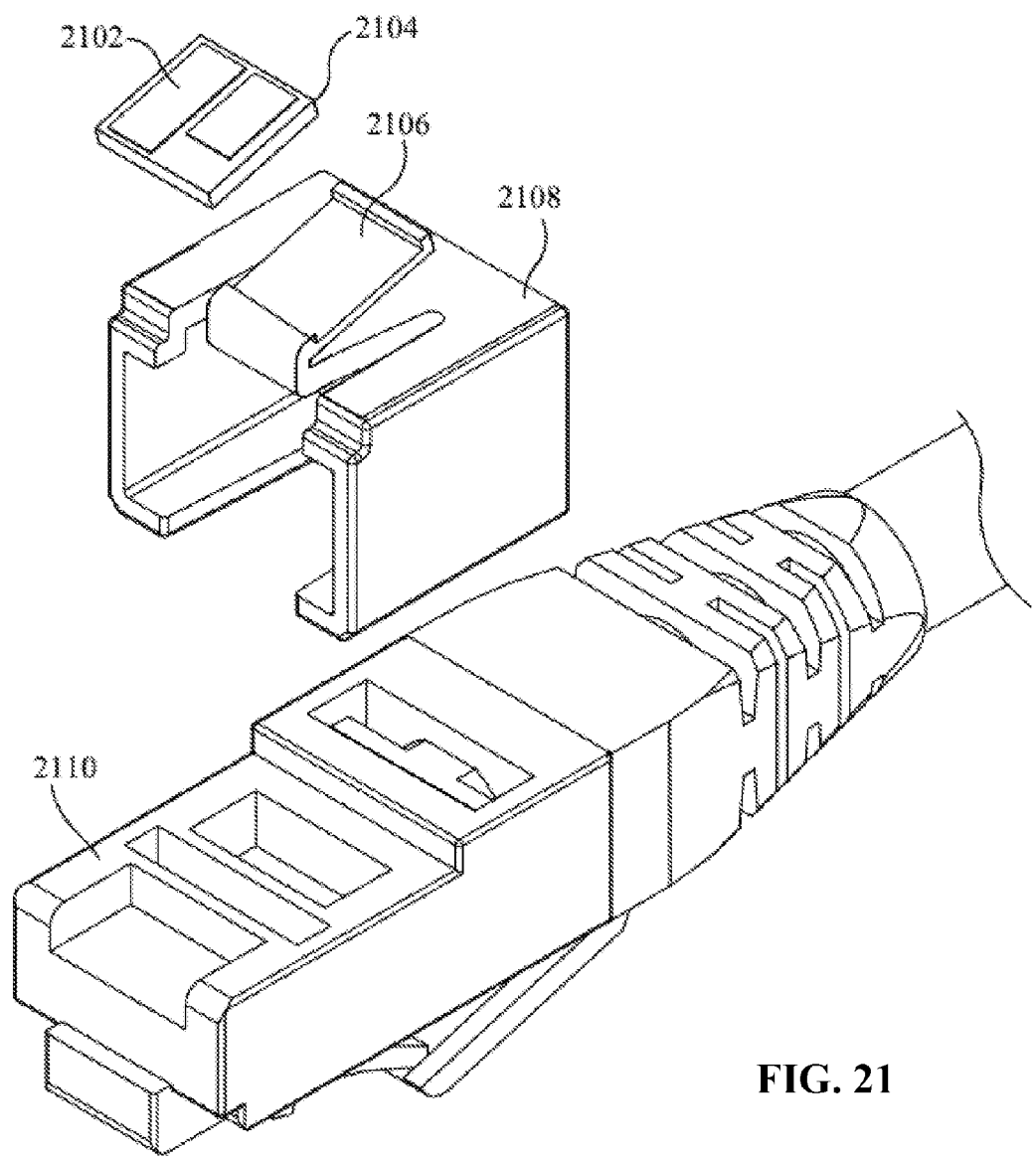
FIG. 21 is an exploded view of an example retrofittable 1-wire chip holder assembly that is compatible with a USB sensor bar.

FIG. 21 illustrates an example design for a retrofittable 1-wire chip holder that is compatible with the 1-wire chip reading design described above. This design converts a standard patch cable plug to an intelligent plug capable of storing identification data readable by the USB sensor bar. Identification data is stored on a 1-wire chip 2104 having two electrically conductive contact pads 2102. The 1-wire chip 2104 is physically mounted to a plug 2110 using the 1-wire chip holder 2108, which can be attached to the plug 2110. The 1-wire chip holder 2108 comprises a raised retaining portion 2106 that holds the 1-wire chip 2104 in place.

Figure 22:
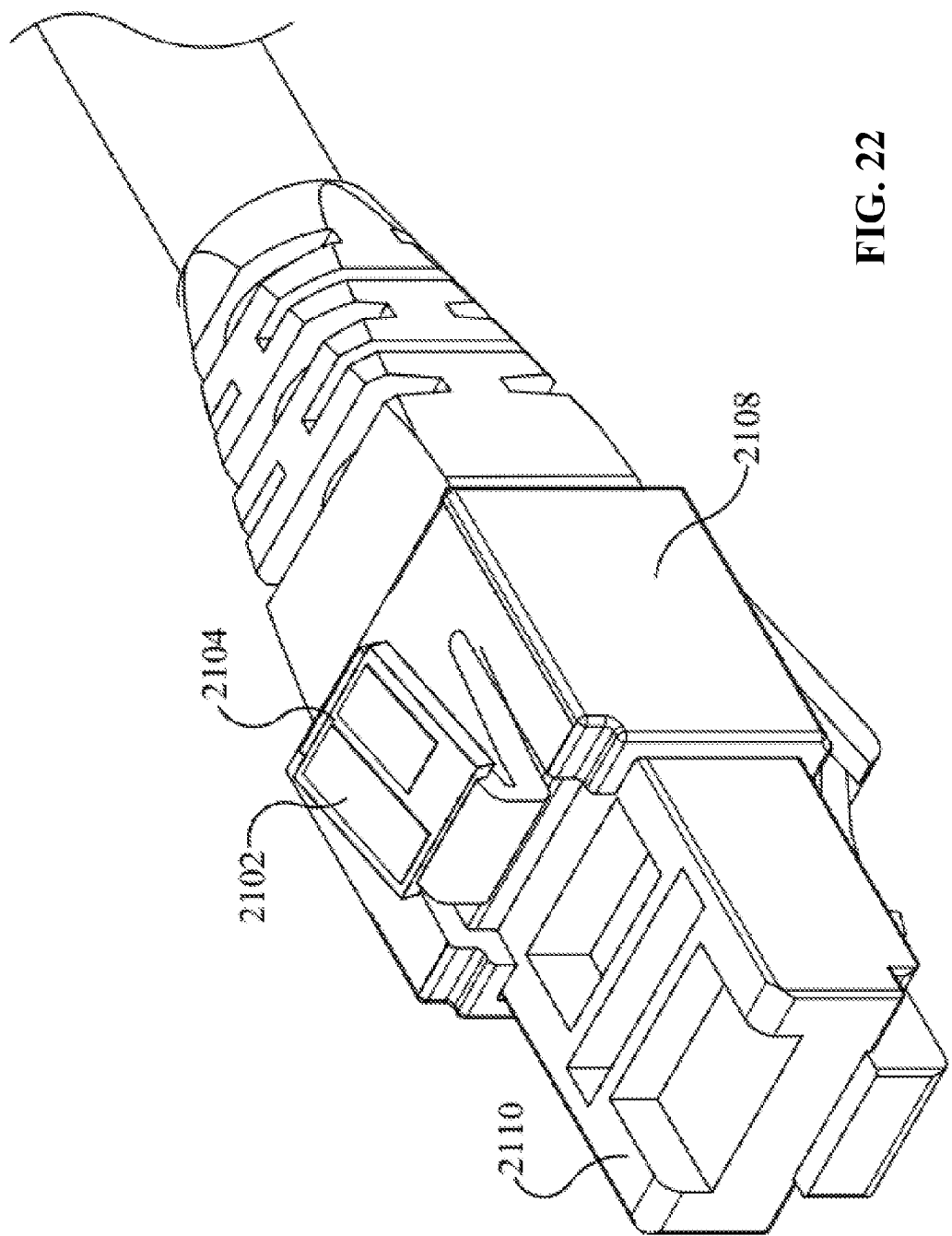
FIG. 22 illustrates an assembled 1-wire chip holder.
Figure 23:
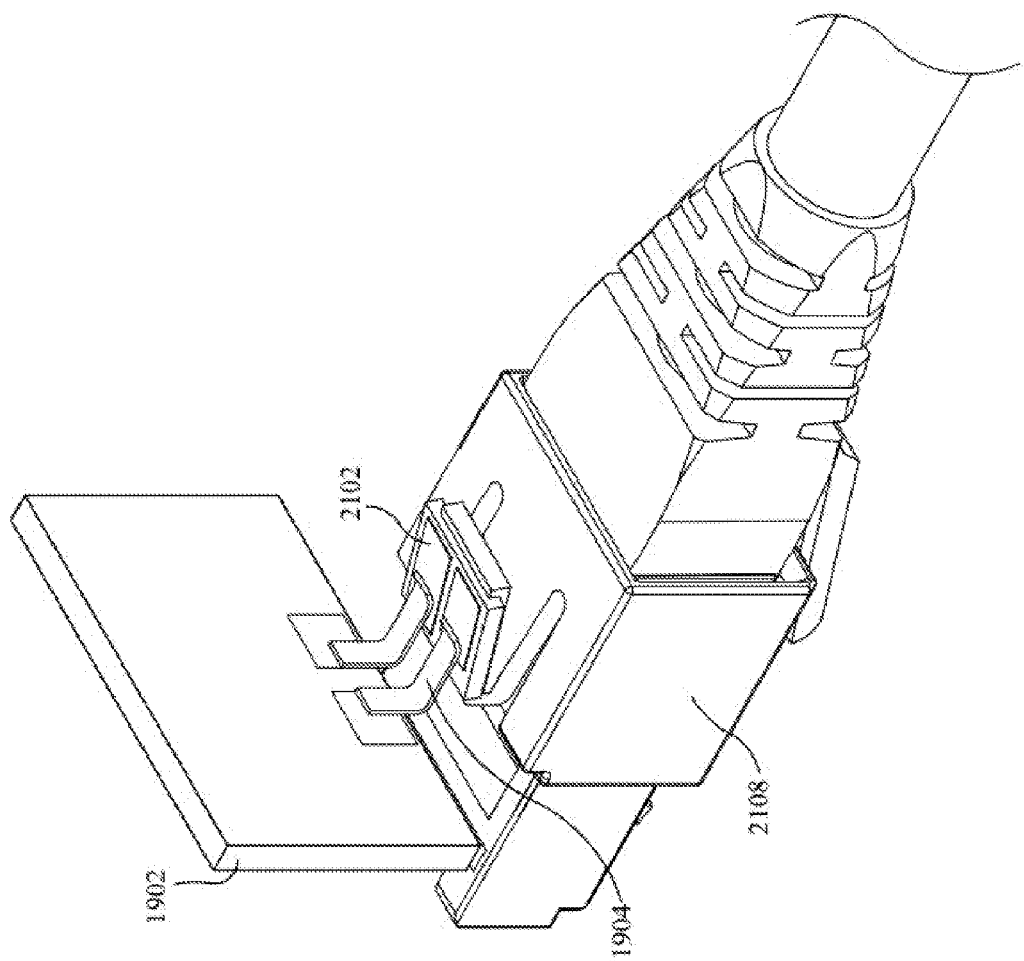
FIG. 23 illustrates an electrical connection between contact pads of a 1-wire chip and sensing contacts of a USB sensor bar.

FIG. 22 illustrates the assembled 1-wire chip holder components. As shown, the retaining portion 2106 holds the 1-wire chip 2104 at an angle relative to the upper surface of the plug, with the outward facing surface of the 1-wire chip 2104 facing generally toward the front of the plug. The 1-wire chip 2104 is oriented in the chip holder 2108 such that the contact pads 2102 are outward facing, allowing the contact pads 2102 to electrically connect to the contacts 1904 when the plug is inserted into the receptacle, as illustrated in FIG. 23.

Figure 24:
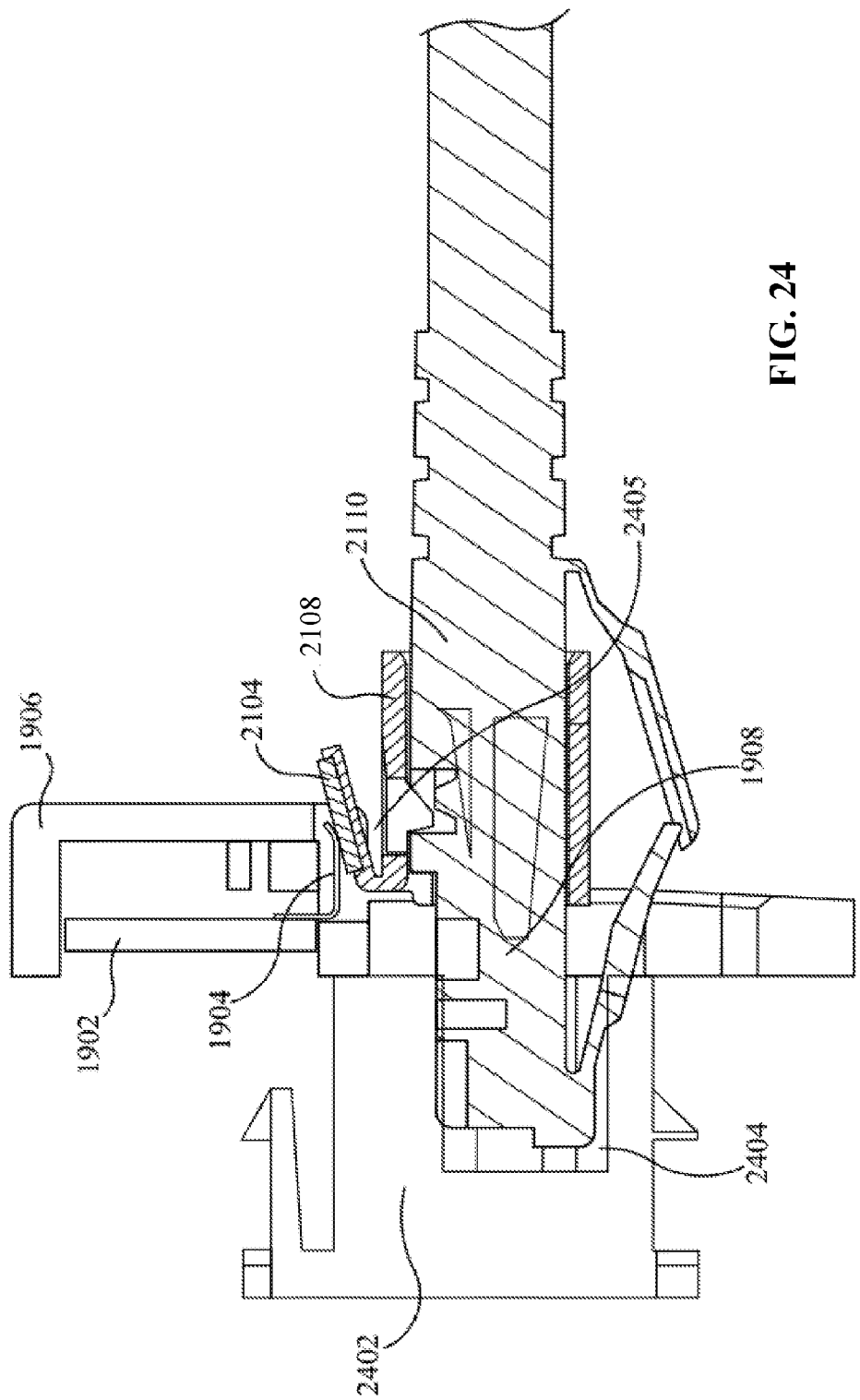
FIG. 24 is a cross-section view of a patch cable plugged into a patch panel fitted with a USB sensor bar overlay.

FIG. 24 is a cross-section view of a patch cable plugged into a patch panel 2402 fitted with a USB sensor bar overlay panel 1906. As shown, when the USB sensor bar overlay panel 1906 with printed circuit board 1902 is mounted to the front of patch panel 2402, contacts 1904 within 1-wire chip reading port 2405 are located above the patch panel port 2404. Window 1908 is oriented over the patch panel port 2404 to allow the plug 2110 to pass through for insertion into port. When the plug is inserted into port 2404, the 1-wire chip is inserted into 1-wire chip reading port 2405 of the USB sensor bar overlay panel 1906, and the two contact pads of the 1-wire chip 2104 make contact with the two contacts 1904, respectively, so that sensing circuitry on printed circuit board 1902 can read the identification data stored on the 1-wire chip 2104.

FIGS. 25-29 illustrate another example 1-wire chip holder design for an intelligent patch cable, and a corresponding 1-wire chip reader design that can be included in either of the retrofittable or pre-integrated versions of the USB sensor bar. As will be demonstrated below, this design can ensure that a consistent, robust connection force is applied between the sensor contacts and the contact pads of the 1-wire chip even if the cable is flexed near the mated contact junction.

Figure 25A:
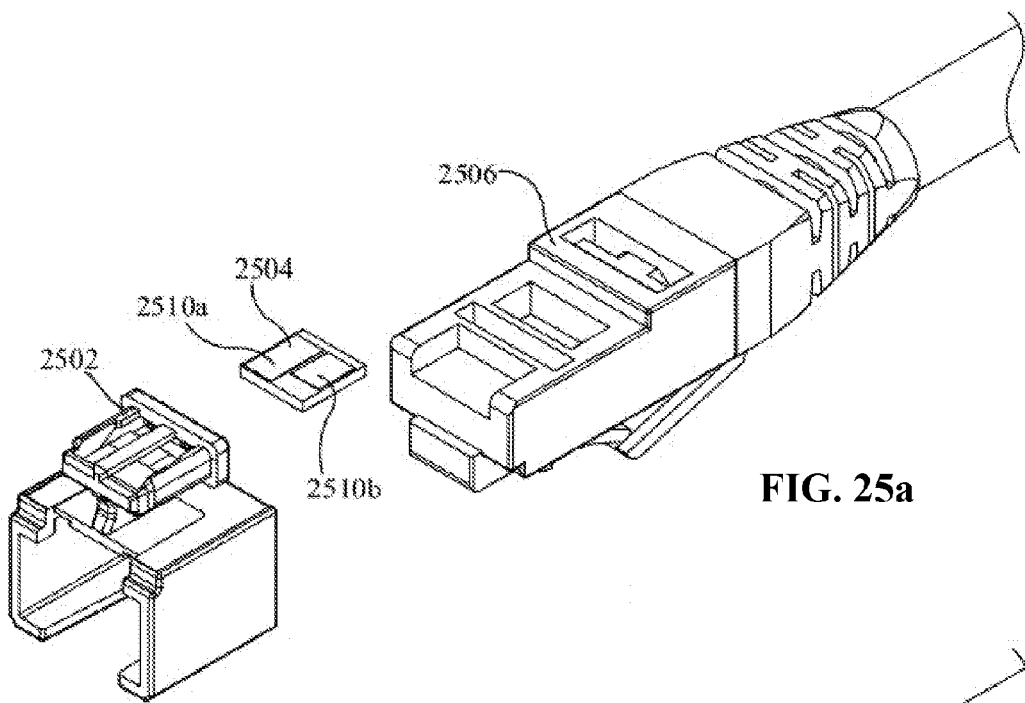
FIG. 25a is an exploded view of an example retrofittable 1-wire chip holder assembly for a copper patch cable.

FIG. 25a is an exploded view of an assembly for attaching a 1-wire memory chip 2504 to a registered jack (RJ) connector 2506 of a copper patch cable. The 1-wire chip holder 2508 is configured to slip onto the front of RJ connector 2506 to render the connector compatible with the intelligent monitoring system described herein. In contrast to 1-wire chip holder 2108, which comprised an angled retaining portion 2106 for holding the 1-wire chip at an angle relative to the top surface of the holder, 1-wire chip holder 2508 comprises an elevated retaining portion 2502 for holding 1-wire memory chip 2504 substantially parallel with the top surface of 1-wire chip holder 2108. Note that the contact pads of 1-wire memory chip 2504 comprise a longer pad 2510a and a shorter pad 2510b, wherein the edges of the two contact pads facing toward the rear of 1-wire chip holder 2508 are flush, and the edges of the contact pads facing the toward the front of 1-wire chip holder 2508 are staggered. In the present example, the longer pad 2510a is the ground lead, while the shorter pad 2510b is the signal lead.

Figure 25B:
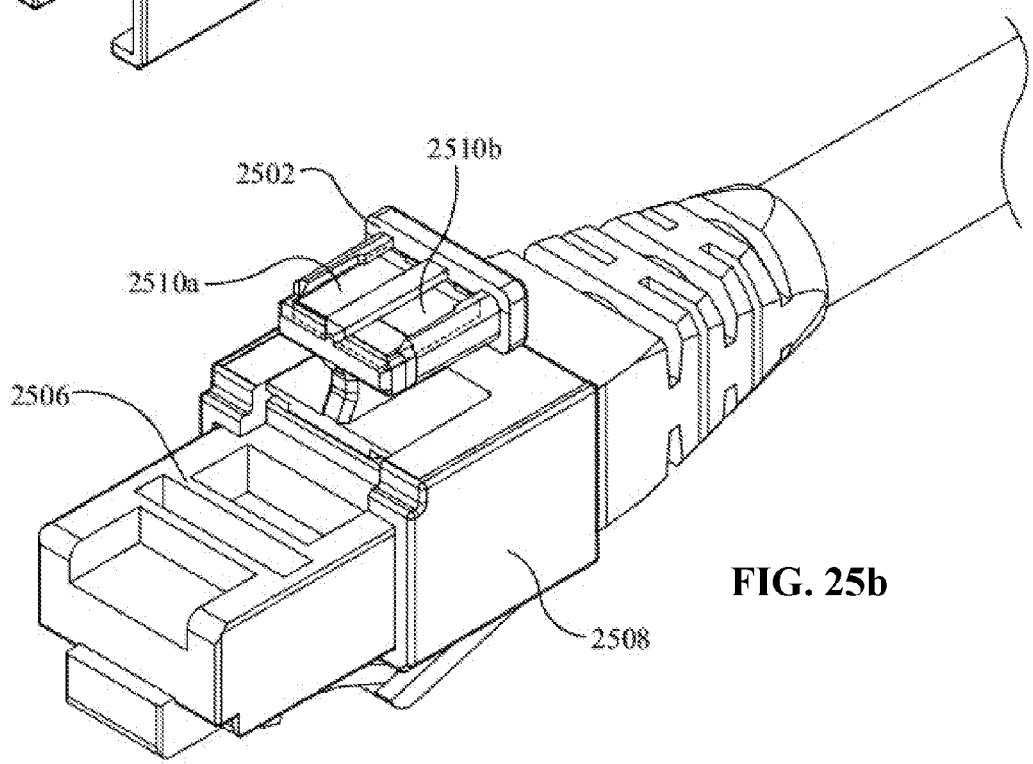
FIG. 25b illustrates an assembled 1-wire chip holder for a copper patch cable using a first orientation of a 1-wire memory chip.
Figure 25C:
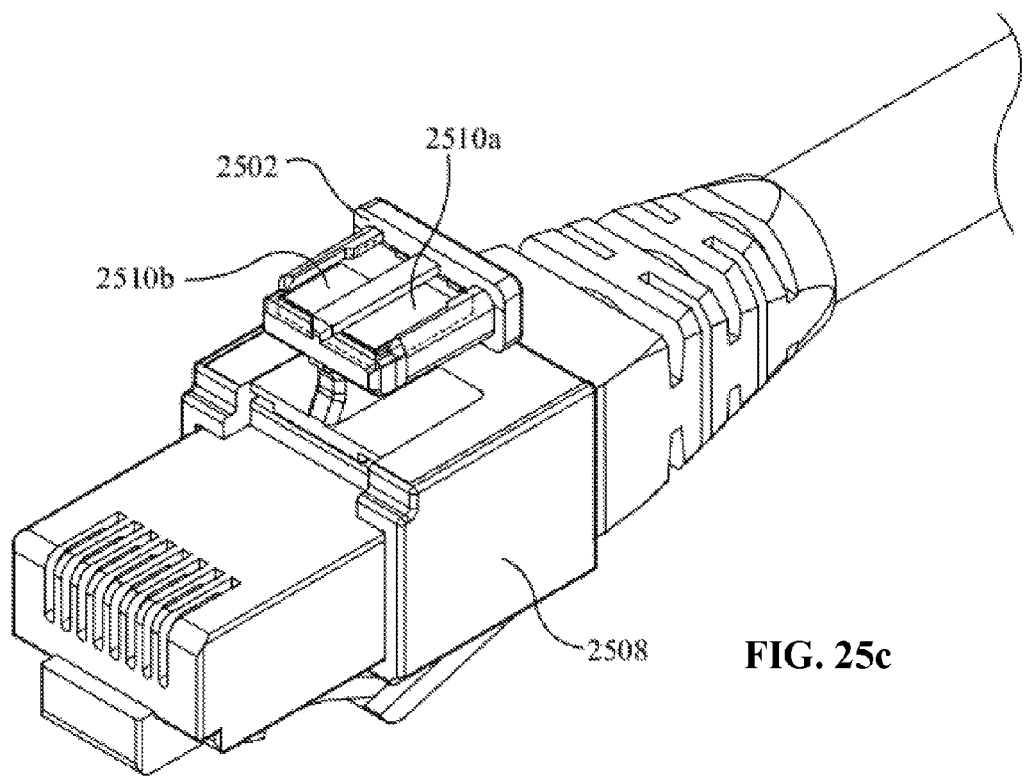
FIG. 25c illustrates an assembled 1-wire chip holder for a copper patch cable using a second orientation of a 1-wire memory chip.

FIG. 25b illustrates the assembled components for this 1-wire chip holding design. In this assembly, 1-wire memory chip 2504 is oriented in the retaining portion 2502 such that the staggered edges of contact pads 2510a and 2510b are facing forward (toward the front of 1-wire chip holder 2508). This arrangement ensures that the longer pad 2510a (the 1-wire chip ground lead) makes contact with its corresponding data reading sensor contact before the shorter pad, allowing any static electricity that may have accumulated in the chip to be discharged before the signal lead makes contact with the sensors (e.g., in a scenario in which static from the user's body has transferred to 1-wire memory chip 2504). While this arrangement can protect 1-wire memory chip 2504 from electrical damage, there may be some risk of inadvertent disconnection between the shorter contact pad 2510b and its corresponding sensor contact in the data reading port, particularly if the plug has significant freedom of movement while engaged with the patch panel jack. This issue can be remedied by rotating the chip inside the retaining portion 2502 such that the flush edges of contact pads 2510a and 2510b face forward toward the front of 1-wire chip holder 2508, as illustrated in FIG. 25c. This arrangement ensures a reliable connection between contact pads 2510a and 2510b and their corresponding sensor contacts in the data reading port, and therefore may be a preferred arrangement in some applications in which static-related damage is not a concern.

Figure 26:
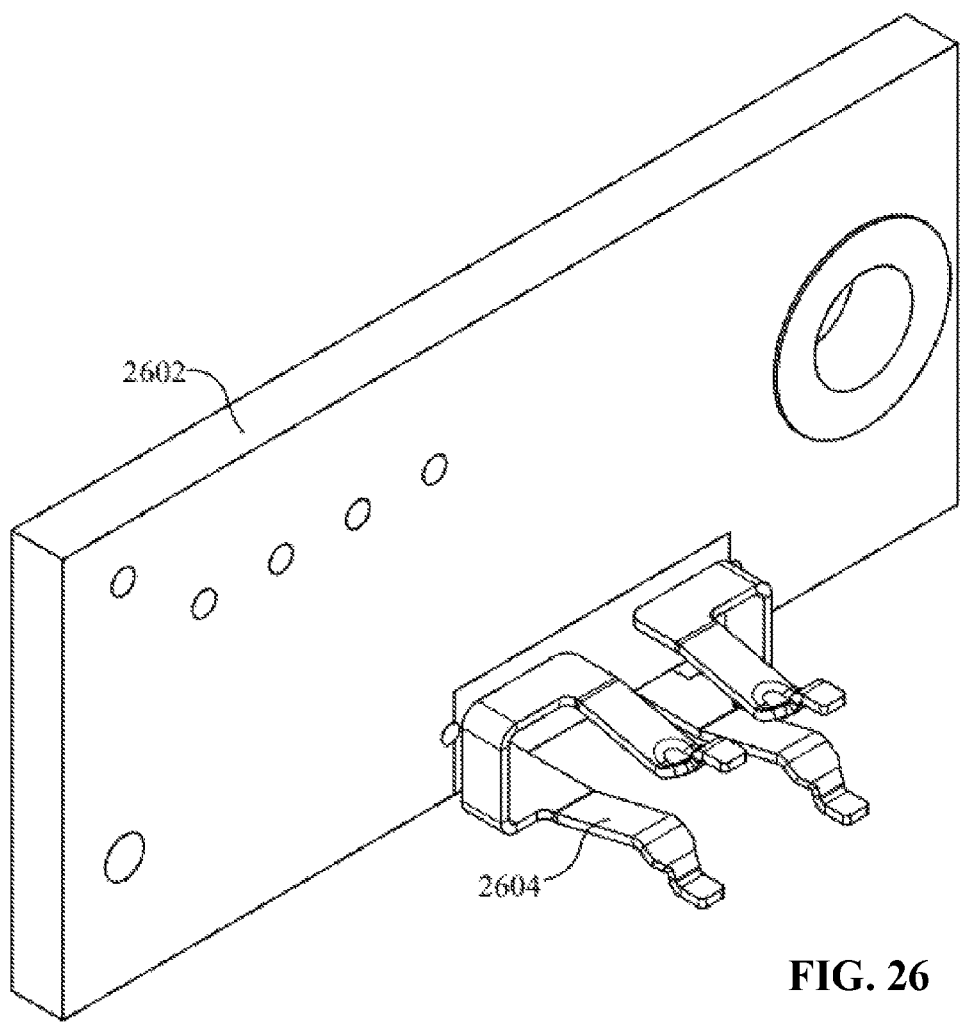
FIG. 26 illustrates a printed circuit board comprising spring contacts for reading cable identification data from a 1-wire memory chip attached to a cable plug.

FIG. 26 illustrates a portion of a printed circuit board 2602 of a USB sensor bar configured to mate with the assembly depicted in FIG. 25. Printed circuit board 2602 comprises data reading circuitry configured to read cable identification data from 1-wire memory chip 2504. Printed circuit board 2602 can be mounted inside an overlay panel used to convert a standard patch panel to an intelligent patch panel capable of reading cable identification data and exchanging information with a device manager over a USB bus, as described in previous examples. Alternatively, printed circuit board 2602 can be a native component of an intelligent patch panel. The illustrated portion corresponds to a single 1-wire chip reader associated with a corresponding patch panel cable port. Spring contacts 2604 mounted to printed circuit board 2602 are electrically connected to the data reading circuitry (not shown) resident on the printed circuit board 2602. The design of the data reading circuitry and spring contacts 2604 may depend on whether the 1-wire chip will be oriented according to the arrangement of FIG. 25b or the arrangement of FIG. 25c.

Figure 27:
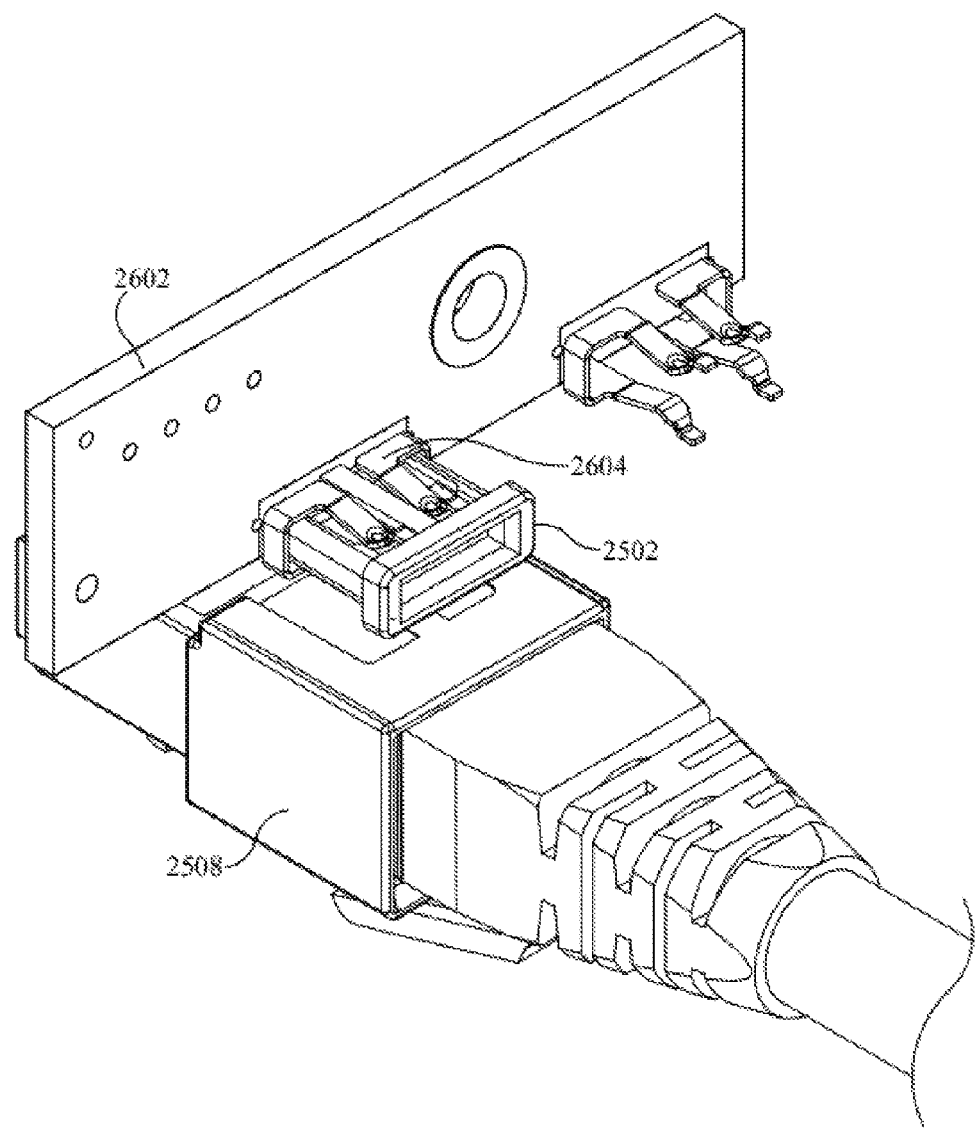
FIG. 27 illustrates an electrical interfacing between spring contacts of a printed circuit board and a 1-wire memory chip attached to a copper patch cable plugged into a patch panel port.

FIG. 27 illustrates the 1-wire chip holder design of FIG. 25 interfacing with spring contacts 2604. The upper two contacts of spring contacts 2604 are designed to make contact with the contact pads of the 1-wire memory chip 2504 when the patch cable plug (fitted with the 1-wire chip holder 2508) is inserted into the cable port. The lower two contacts of spring contacts 2604 are designed to apply a force on the bottom surface of retaining portion 2502, creating a clamping force between the upper and lower contacts that ensures a reliable contact force between the upper spring contacts and the contact pads of 1-wire memory chip 2504.

The spring contact design depicted in FIGS. 26 and 27 can maintain a robust and consistent contact force between the upper spring contacts and the contact pads of the 1-wire chip even if the patch cable is flexed near the port. For example, in some scenarios approximately 100 grams of consistent force is recommended to maintain a reliable electrical connection between the sensing contacts and the contact pads of the 1-wire memory chip. The force created by the clamping action of the upper and lower portions of spring contacts 2604 can ensure that this recommended force is maintained despite flexing of the cable at or near the mated contact junction, thereby reducing the risk of poor signal integrity due to high resistivity that can build up in the contact region over time.

Figure 28:
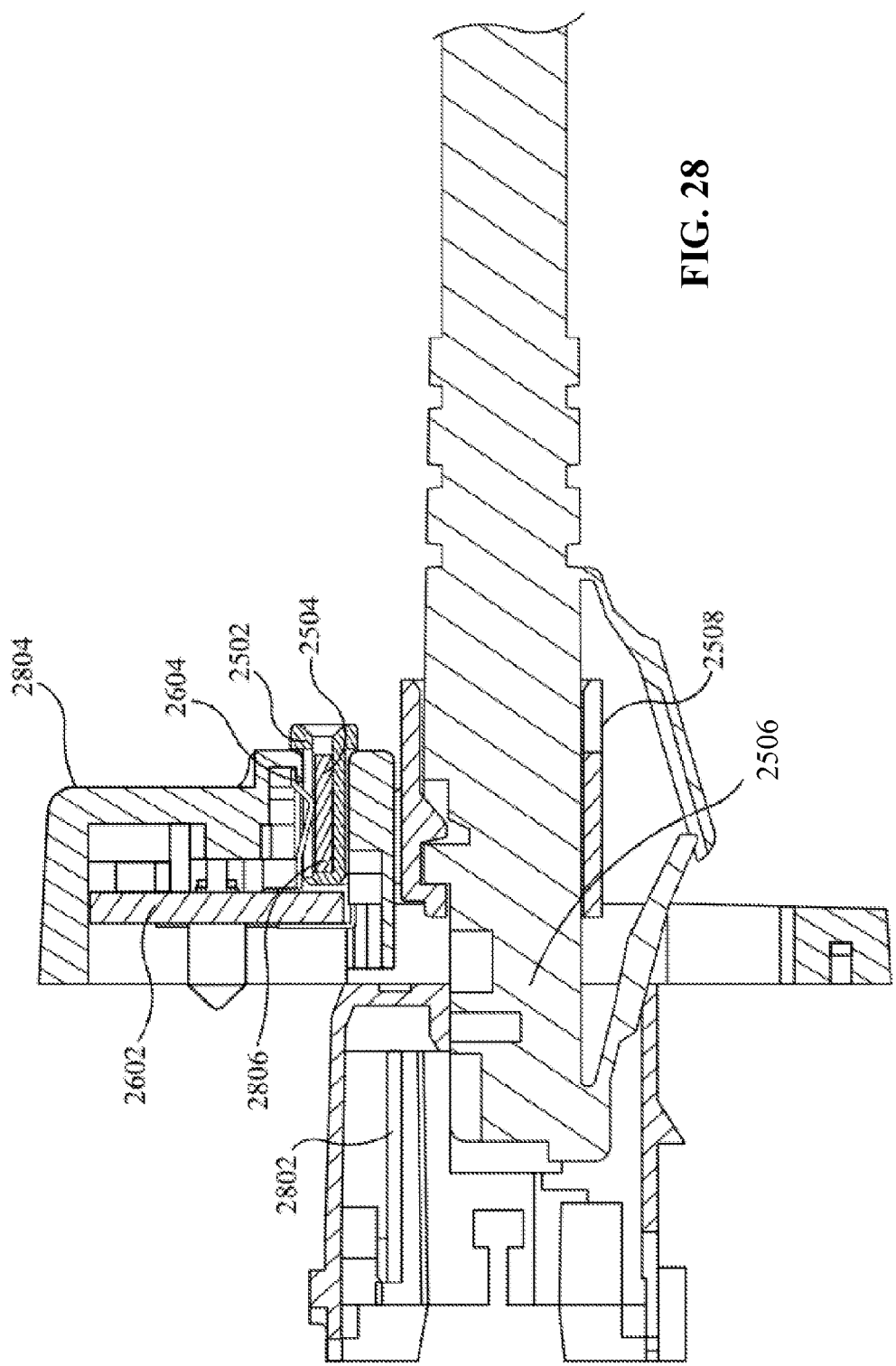
FIG. 28 is a side view of a copper patch cable fitted with a 1-wire chip holder assembly and plugged into a patch panel port fitted with a USB sensor bar overlay.

FIG. 28 depicts a side view of copper cable connector 2506—outfitted with 1-wire chip holder 2508—plugged into a patch panel port 2802 that has been fitted with a USB sensor bar overlay panel 2804 that contains printed circuit board 2602. As shown, when connector 2506 is inserted into patch panel port 2802, 1-wire memory chip 2504 held by retaining portion 2502 is inserted into a data reading port 2806 of overlay panel 2804. Inside the data reading port, the upper contacts of spring contacts 2604 make firm contact with the contact pads of 1-wire memory chip 2504, ensuring that cable identification data will be reliably read from the chip.

Figure 29:
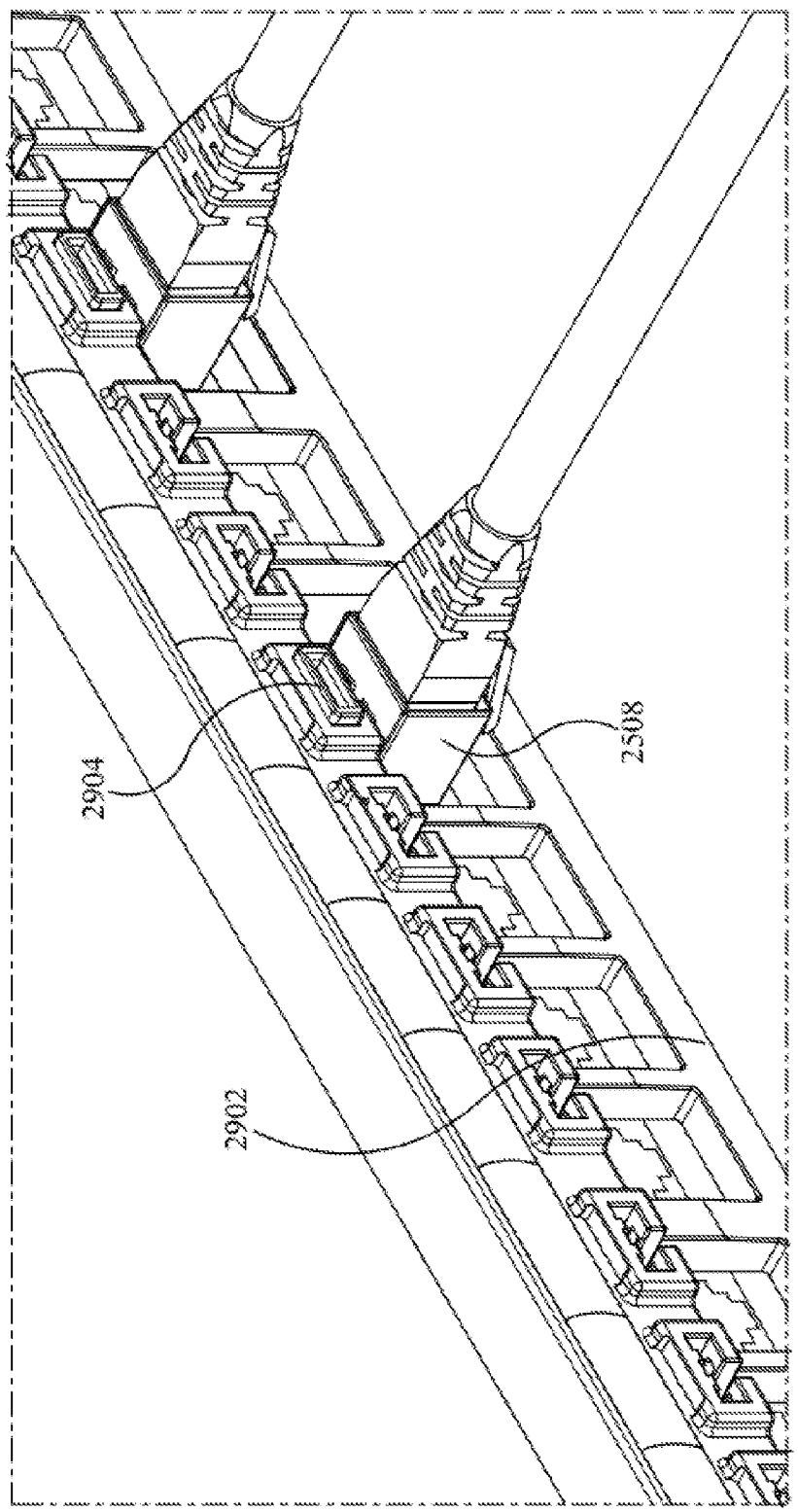
FIG. 29 is a photographic view of an intelligent patch cable plugged into a patch panel that has been fitted with a USB sensor bar overlay.

FIG. 29 is a photographic view of an intelligent patch cable plugged into a patch panel that has been fitted with a USB sensor bar overlay. As shown, a patch cable has been fitted with 1-wire chip holder 2508, and a patch panel has been fitted with an overlay panel 2902 containing USB sensor bar circuitry. Contacts for reading data from the 1-wire chip are located in data reading ports 2904 located above each port of the patch panel.

Figure 30A:
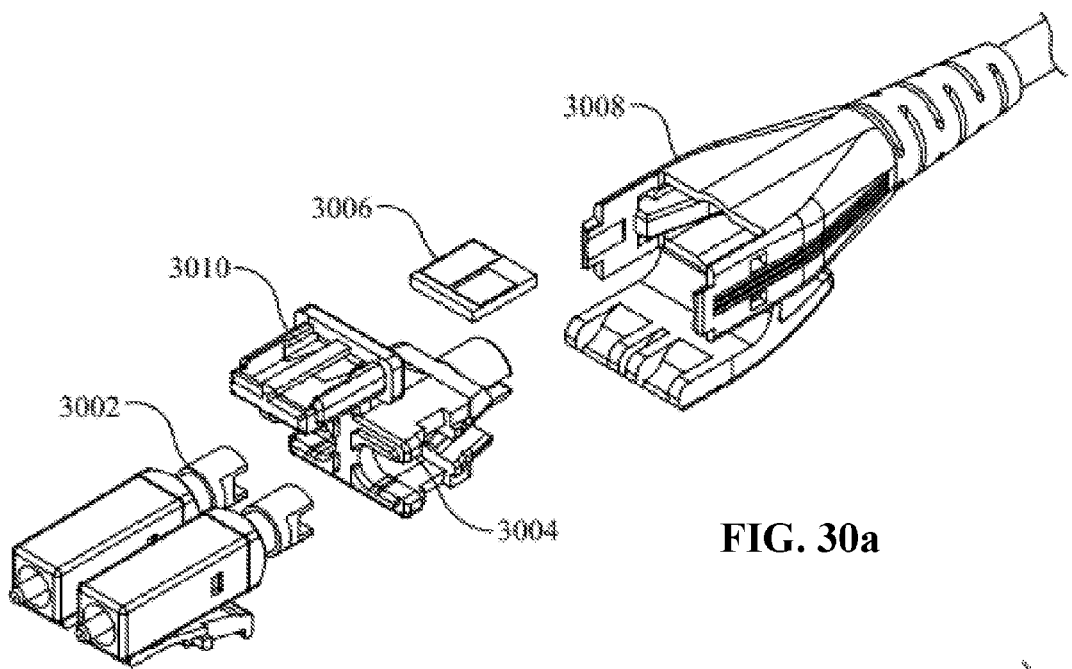
FIG. 30a is an exploded view of an example retrofittable 1-wire chip holder assembly for a fiber cable.
Figure 30B:
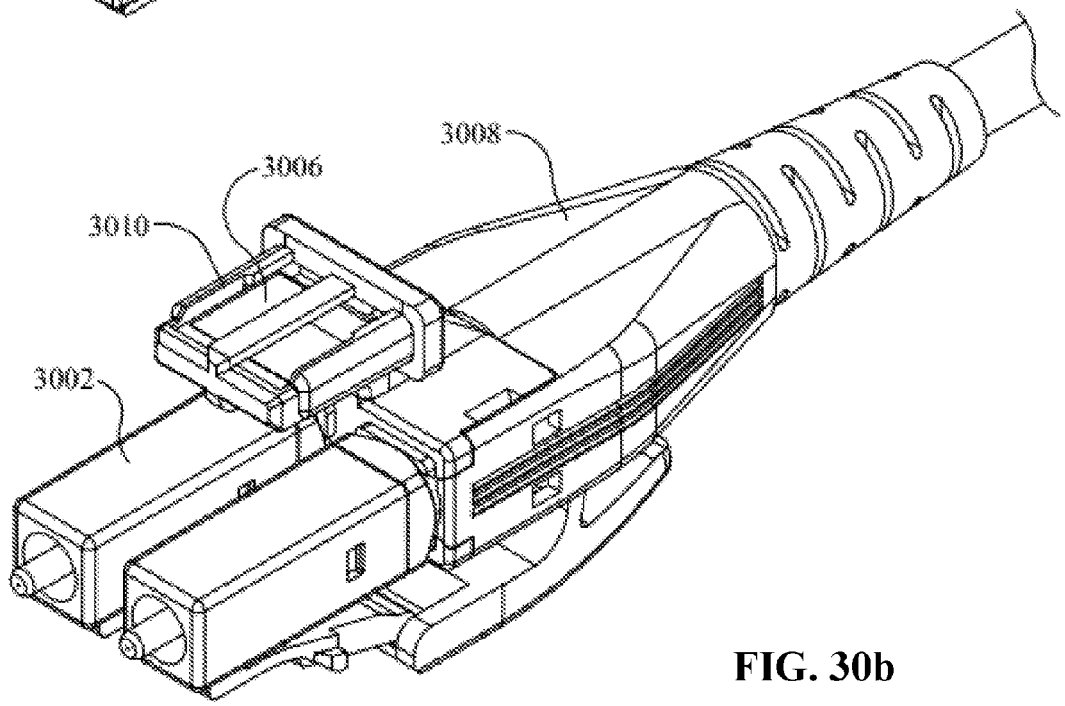
FIG. 30b illustrates an assembled 1-wire chip holder for a fiber cable.

FIG. 30*a* depicts a similar 1-wire chip holding assembly for a Lucent connector (LC) 3002 of a fiber optic cable. Similar to the RJ connector version illustrated in FIGS. 25-29, a 1-wire chip holder 3004 comprises an elevated retaining portion 3010 configured to hold a 1-wire memory chip 3006. 1-wire chip holder 3004 is designed to fit between the LC connector 3002 and the boot assembly 3008 of the fiber optic cable, such that when the LC connector 3002 is inserted into the boot assembly 3008 the 1-wire chip holder 3004 is secured on the plug. FIG. 30*b* illustrates the assembled components for this 1-wire chip holding design.

Figure 31:
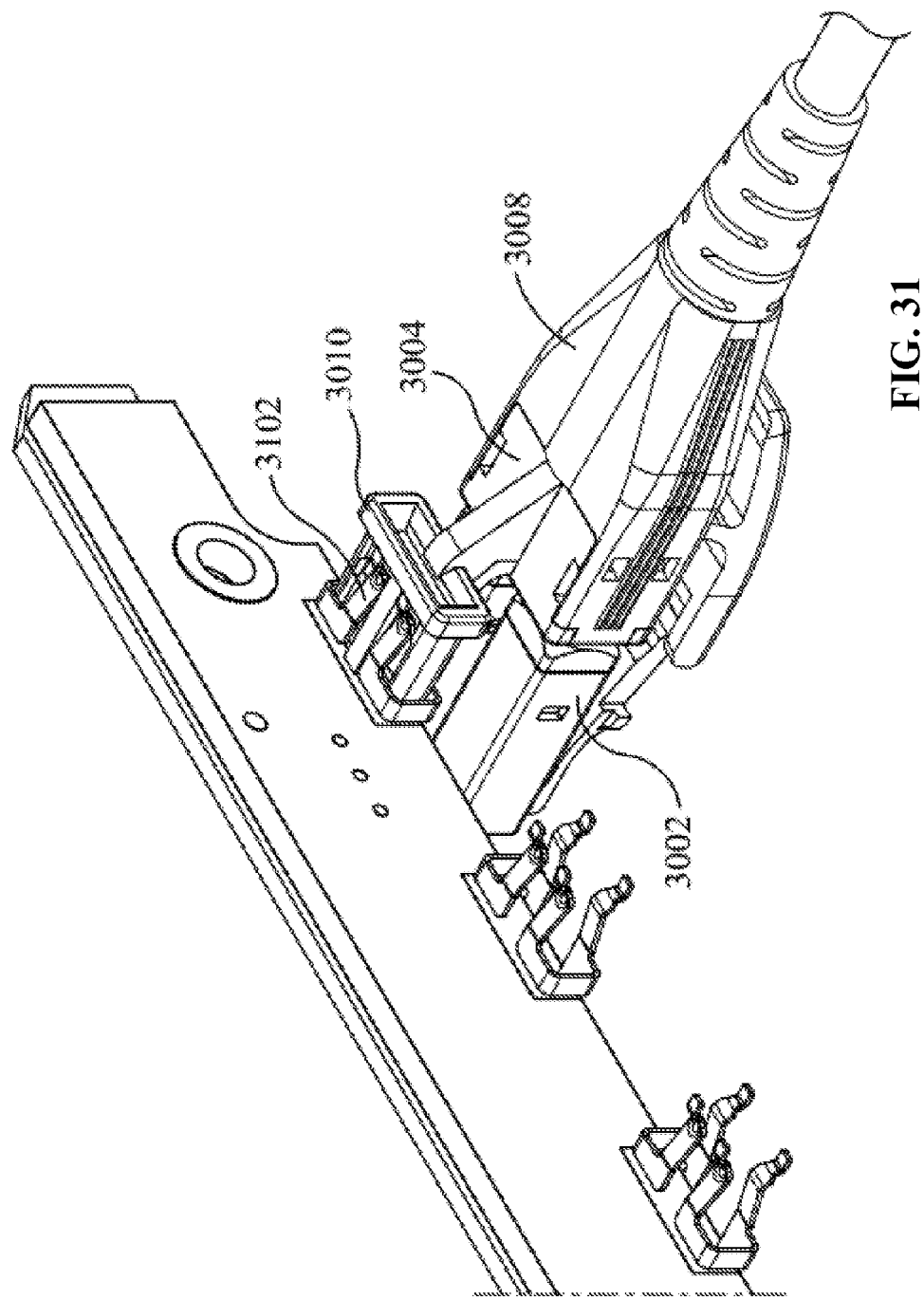
FIG. 31 illustrates an electrical interfacing between spring contacts of a printed circuit board and a 1-wire memory chip attached to a fiber cable plugged into a fiber enclosure port.
Figure 32:
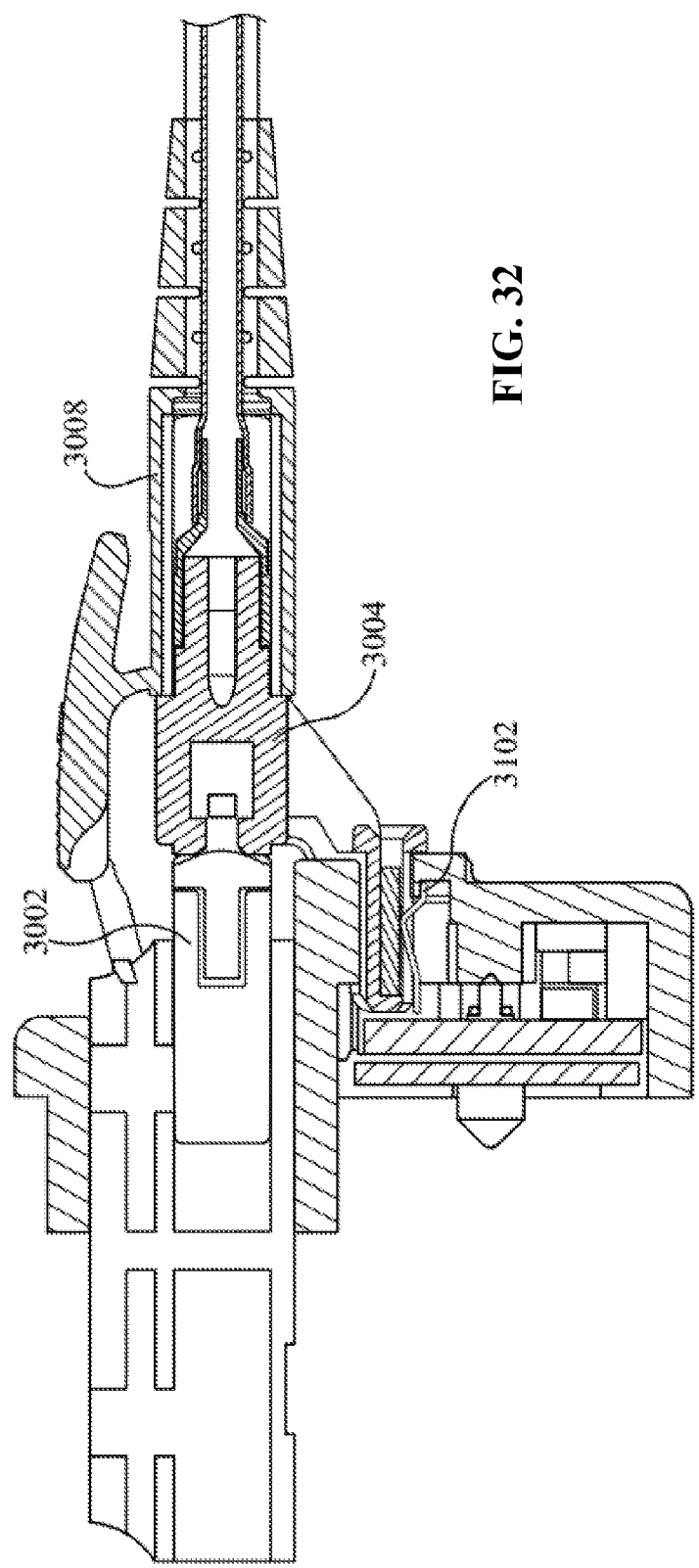
FIG. 32 is a side view of a fiber cable fitted with a 1-wire chip holder assembly and plugged into a fiber enclosure port fitted with a USB sensor bar overlay.

FIGS. 31 and 32 depict two different views of this 1-wire chip holding assembly inserted into a fiber enclosure that has been fitted with a USB sensor bar overlay. In a similar manner to the RJ connector examples depicted in FIGS. 27 and 28, spring connectors 3102 associated with each fiber enclosure port maintain consistent firm contact with the contact pads of the 1-wire chip while the LC connector is plugged into the port.

Figure 33A:
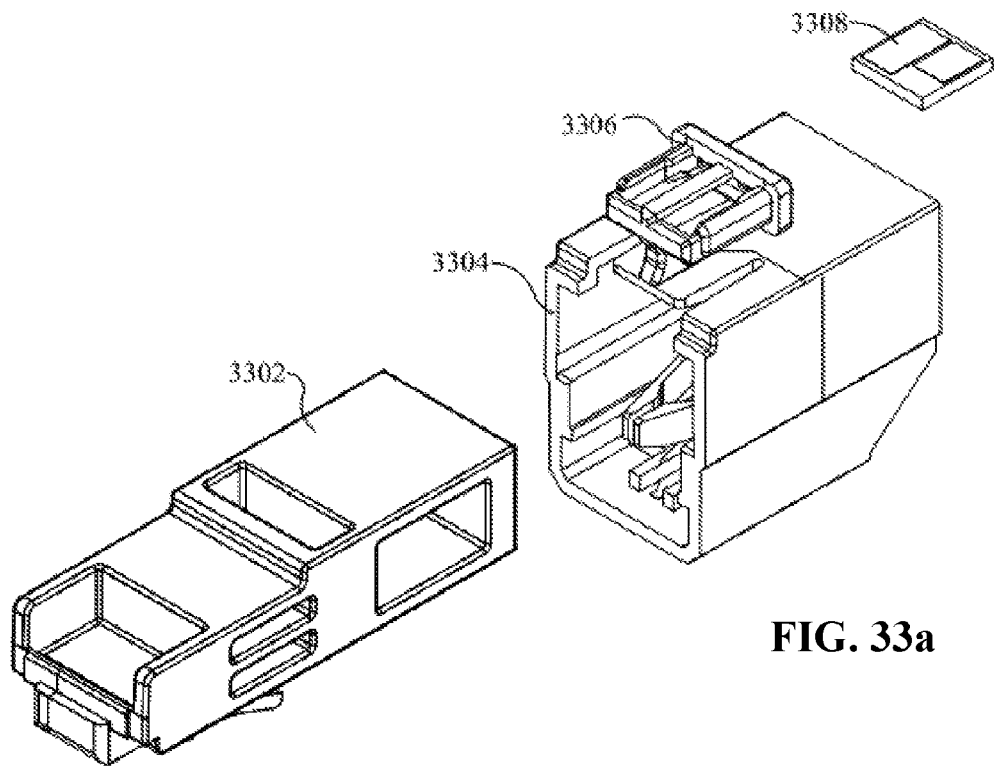
FIG. 33a is an exploded view of a 1-wire chip holder assembly for a copper patch cable that provides physical port security.
Figure 33B:
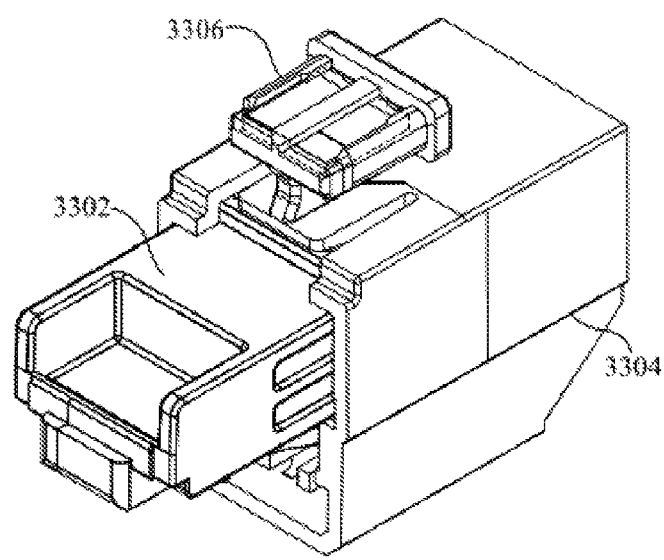
FIG. 33b illustrates an assembled 1-wire chip holder for a copper patch cable that provides physical port security.

FIGS. 33*a* and 33*b* illustrate an example 1-wire chip holding design that provides additional physical port security in the form of a secure port blocker. FIG. 33*a* illustrates an exploded view of a 1-wire chip holding assembly for an RJ cable connector according to one or more embodiments. Similar to previous examples, a 1-wire chip holder 3304 comprises an elevated retaining portion 3306 configured to hold a 1-wire memory chip 3308. 1-wire chip holder 3304 is configured to slip onto the front of an RJ connector to facilitate mounting the 1-wire memory chip to a copper patch cable. The front of the 1-wire chip holder 3304 is also configured to receive an RJ port blocker 3302, which provides physical port security by mechanically locking the RJ connector in the patch panel port. RJ port blocker 3302 is a sleeve-like mechanism configured to slide over the RJ connector of the patch cable, encasing the cable plug while leaving the contact portions of the cable conductors exposed.

FIG. 33*b* illustrates the assembled components of the secure assembly. When an RJ connector fitted with this secure assembly is inserted into a patch panel port, RJ port blocker 3302 locks the plug in the port. In order to prevent physical tampering with the network and to provide a physical layer of security, RJ port blocker 3302 is configured be unlocked and removed from the port only by use of a specialized extraction tool designed to mate with the RJ port blocker 3302. The physical port security offered by this assembly can prevent unauthorized removal of patch cables or physical rerouting of network segments by unauthorized personnel. This secure RJ connector assembly, used in conjunction with the USB sensor bar and device manager described above, provides both physical security of network segments by virtue of the RJ port blocker 3302 as well as electronic port security by virtue of the USB sensor bar functionality.

Figure 34:
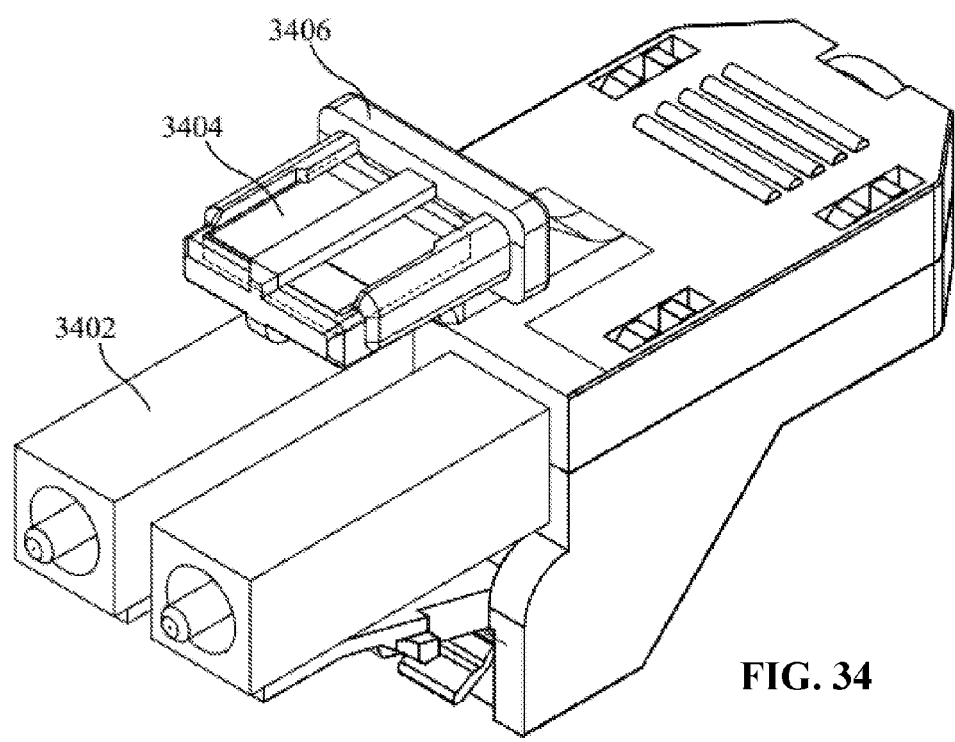
FIG. 34 illustrates an assembled 1-wire chip holder for a fiber cable that provides physical port security.

FIG. 34 illustrates a fiber optic version of this secure 1-wire chip assembly for an LC connector. Similar to the secure RJ assembly illustrated in FIGS. 33*a* and 33*b*, the secure LC assembly comprises a 1-wire chip holder 3408 having a retaining portion 3406 for holding a 1-wire memory chip 3404. The assembly also includes an LC port blocker 3402 that serves a similar function to that of the RJ port blocker 3302 described above. Specifically, when a fiber optic LC connector outfitted with the secure RJ assembly is inserted into a port of a fiber enclosure, LC port blocker 3402 locks the LC connector in place. Once locked, the connector can only be removed from the port using a specialized extraction tool matching the type of the LC port blocker 3402.

Although FIGS. 21-34 depict various 1-wire chip holder assemblies as retrofittable components that can be added to a standard copper or fiber cable plug, cables that are pre-molded to include a 1-wire chip holder similar to those depicted in FIGS. 21-34 are also within the scope of one or more embodiments of this disclosure.

Figure 35:
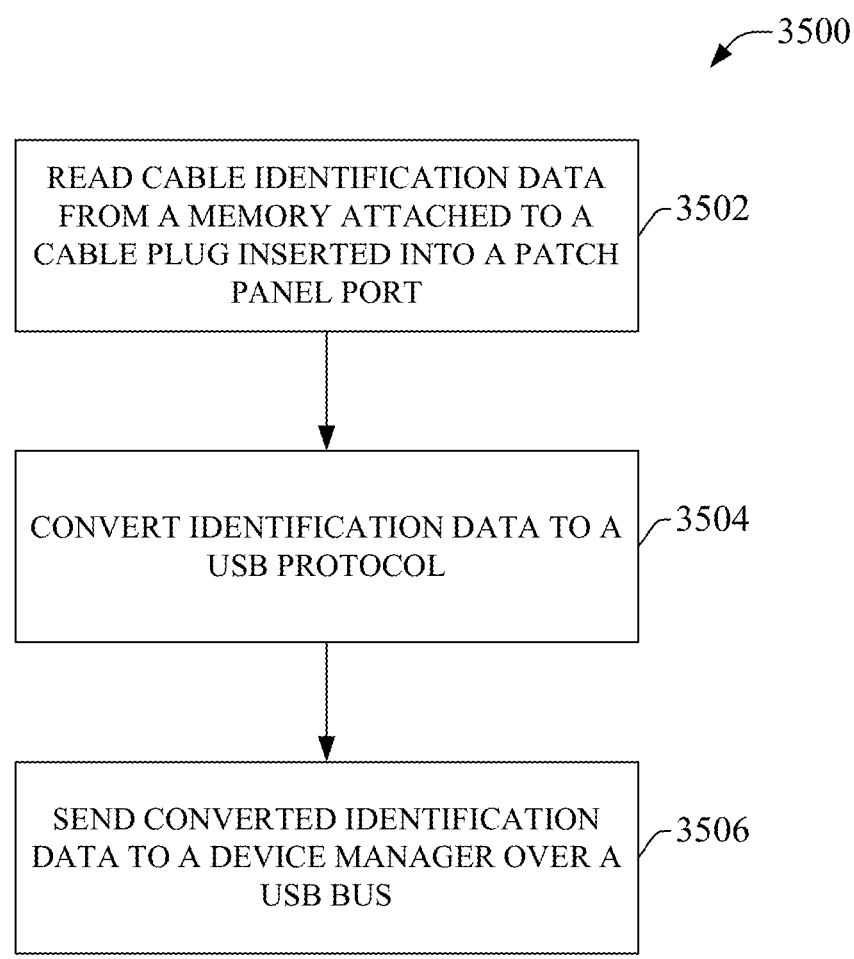
FIG. 35 is a flowchart of an example methodology for collecting network infrastructure data.

FIG. 35 is an example methodology 3500 for collecting network infrastructure data. Initially, at 3502, cable identification data is read from a memory attached to a cable plug inserted into a patch panel port. The memory can comprise, for example, a 1-wire memory chip affixed to the plug boot of the cable using a 1-wire chip holder. The identification data uniquely identifies the cable plug within the context of a network infrastructure, and can be read by a USB sensor bar containing 1-wire chip reading circuitry. The USB sensor bar can be an integrated component of the patch panel, or can be a retrofittable overlay mounted to the front of the patch panel to yield an intelligent patch panel capable of collecting cable identification data and interfacing with a device manager over a USB bus. At 3504, the identification data is converted to a USB protocol. At 3506, the converted identification data is sent to a device manager over a USB bus. The identification data can be sent together with port identification information indicating a patch panel port from which the identification data was read, so that the device manager can accurately associate the cable identification data with the appropriate patch panel port.

Figure 36:
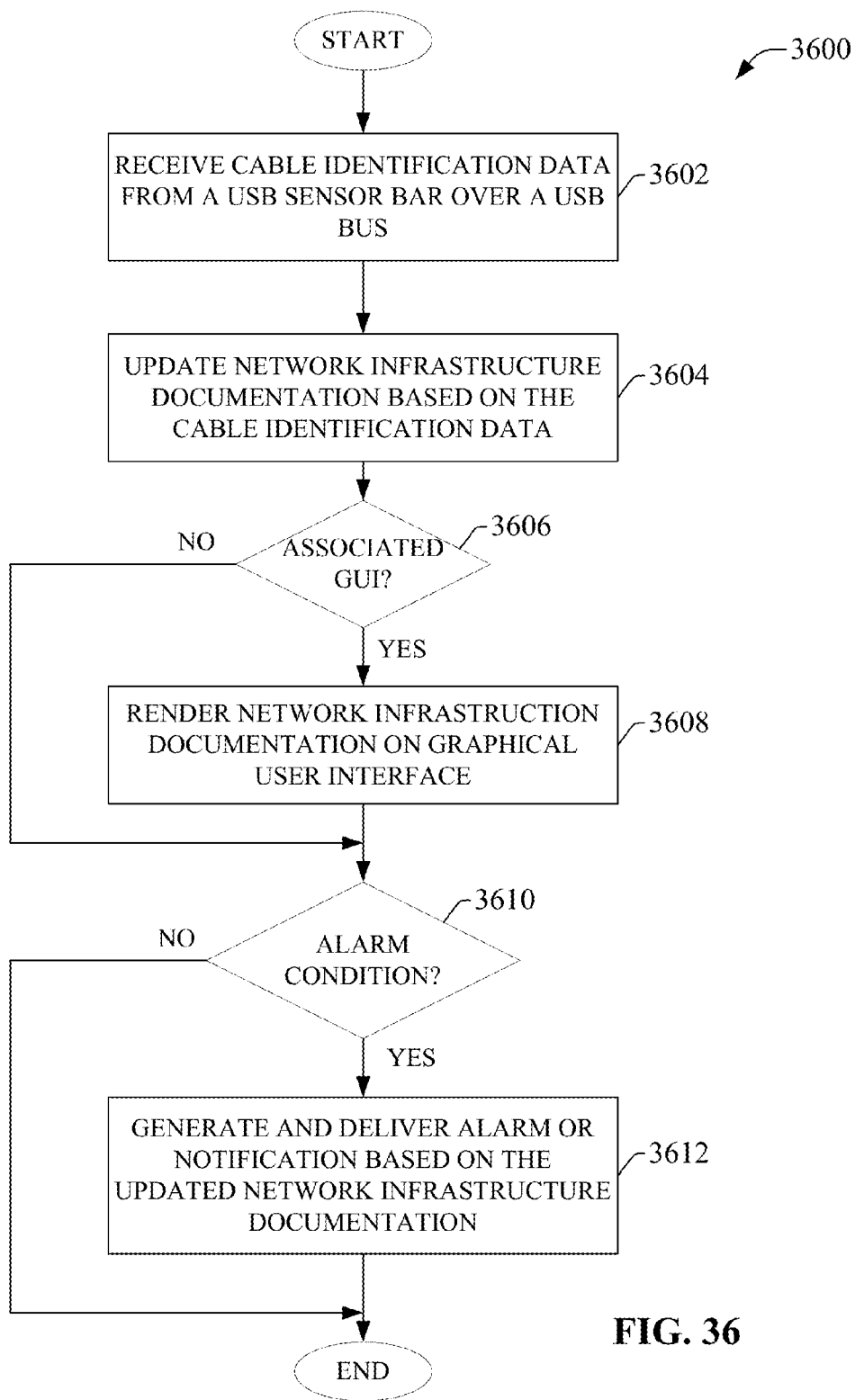
FIG. 36 is a flowchart of an example methodology for receiving and processing cable identification data from a USB sensor bar.

FIG. 36 is an example methodology for receiving and processing cable identification data from a USB sensor bar. Initially, at 3602, cable identification data is received from a USB sensor bar over a USB bus. The identification data can be received over a direct USB connection between the USB bus and a device manager, or can be received from the USB bus via a USB hub.

At 3604, network infrastructure documentation is updated based on the received cable identification data. The network infrastructure documentation can record, for example, an identity of each detected patch cable, an identity of which patch panel and port number each detected patch cable is plugged into, a record of which network branches and/or devices are connected together, or other such network infrastructure information.

At 3606, a determination is made regarding whether the network monitoring system has an associated graphical user interface. If so, the updated network infrastructure documentation is rendered on a graphical user interface. In some embodiments, the graphical user interface can comprise a Web-based application and can be delivered to a client device over the Internet. The interface can convey such information as a status of each network connection, identification of which patch panel ports (and associated network branches and devices) are connected together, a diagram of the network, or other such information.

At 3610, a determination is made regarding whether the updated network infrastructure documentation indicates an alarm condition. In some embodiments, network conditions that warrant alarm or notification output can be predefined in the device manager. If the network infrastructure documentation indicates that a defined alarm condition exists (e.g., a particular cable identifier is no longer detected, indicating that a critical cable has been unplugged; the cable identification data indicates that two network branches that should not be connected have been jumpered together, etc.), an alarm or notification is generated and delivered based on the updated network infrastructure documentation at 3612. The alarm or notification can be delivered to specified client devices defined in the device manager (e.g., over the Internet).

Figure 37:
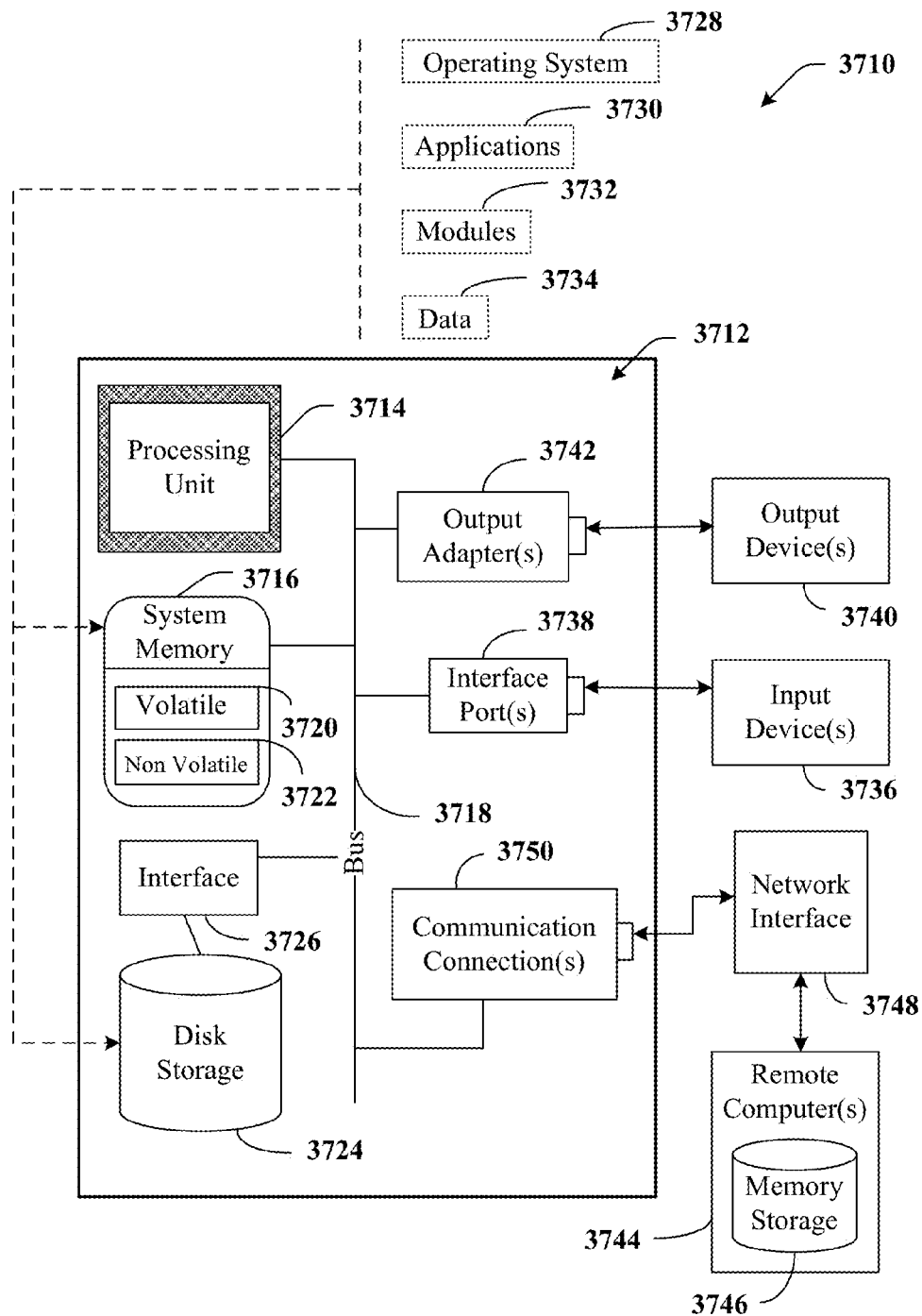
FIG. 37 is an example computing environment.
Figure 38:
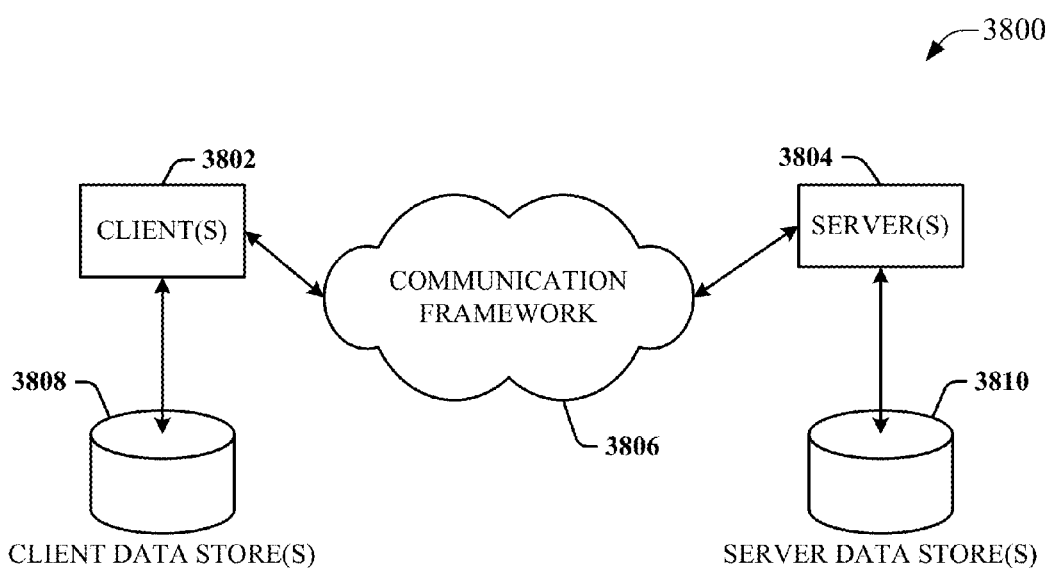
FIG. 38 is an example networking environment.

In order to provide a context for the various aspects of the disclosed subject matter, FIGS. 37 and 38 as well as the following discussion are intended to provide a brief, general description of a suitable environment in which the various aspects of the disclosed subject matter may be implemented.

With reference to FIG. 37, an example environment 3710 for implementing various aspects of the aforementioned subject matter includes a computer 3712. The computer 3712 includes a processing unit 3714, a system memory 3716, and a system bus 3718. The system bus 3718 couples system components including, but not limited to, the system memory 3716 to the processing unit 3714. The processing unit 3714 can be any of various available processors. Multi-core microprocessors and other multiprocessor architectures also can be employed as the processing unit 3714.

The system bus 3718 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 3716 includes volatile memory 3720 and nonvolatile memory 3722. The basic input/output system (BIOS), containing the basic routines to transfer information between elements within the computer 3712, such as during start-up, is stored in nonvolatile memory 3722. By way of illustration, and not limitation, nonvolatile memory 3722 can include read only memory (ROM), programmable ROM (PROM), electrically programmable ROM (EPROM), electrically erasable PROM (EEPROM), or flash memory. Volatile memory 3720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 3712 also includes removable/non-removable, volatile/non-volatile computer storage media. FIG. 37 illustrates, for example a disk storage 3724. Disk storage 3724 includes, but is not limited to, devices like a magnetic disk drive, floppy disk drive, tape drive, Jaz drive, Zip drive, LS-100 drive, flash memory card, or memory stick. In addition, disk storage 3724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 3724 to the system bus 3718, a removable or non-removable interface is typically used such as interface 3726.

It is to be appreciated that FIG. 37 describes software that acts as an intermediary between users and the basic computer resources described in suitable operating environment 3710. Such software includes an operating system 3728. Operating system 3728, which can be stored on disk storage 3724, acts to control and allocate resources of the computer 3712. System applications 3730 take advantage of the management of resources by operating system 3728 through program modules 3732 and program data 3734 stored either in system memory 3716 or on disk storage 3724. It is to be appreciated that one or more embodiments of the subject disclosure can be implemented with various operating systems or combinations of operating systems.

A user enters commands or information into the computer 3712 through input device(s) 3736. Input devices 3736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 3714 through the system bus 3718 via interface port(s) 3738. Interface port(s) 3738 include, for example, a serial port, a parallel port, a game port, and a universal serial bus (USB). Output device(s) 3740 use some of the same type of ports as input device(s) 3736. Thus, for example, a USB port may be used to provide input to computer 3712, and to output information from computer 3712 to an output device 3740. Output adapters 3742 are provided to illustrate that there are some output devices 3740 like monitors, speakers, and printers, among other output devices 3740, which require special adapters. The output adapters 3742 include, by way of illustration and not limitation, video and sound cards that provide a means of connection between the output device 3740 and the system bus 3718. It should be noted that other devices and/or systems of devices provide both input and output capabilities such as remote computer(s) 3744.

Computer 3712 can operate in a networked environment using logical connections to one or more remote computers, such as remote computer(s) 3744. The remote computer(s) 3744 can be a personal computer, a server, a router, a network PC, a workstation, a microprocessor based appliance, a peer device or other common network node and the like, and typically includes many or all of the elements described relative to computer 3712. For purposes of brevity, only a memory storage device 3746 is illustrated with remote computer(s) 3744. Remote computer(s) 3744 is logically connected to computer 3712 through a network interface 3748 and then physically connected via communication connection 3750. Network interface 3748 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 3750 refers to the hardware/software employed to connect the network interface 3748 to the system bus 3718. While communication connection 3750 is shown for illustrative clarity inside computer 3712, it can also be external to computer 3712. The hardware/software necessary for connection to the network interface 3748 includes, for exemplary purposes only, internal and external technologies such as, modems including regular telephone grade modems, cable modems and DSL modems, ISDN adapters, and Ethernet cards.

FIG. 38 is a schematic block diagram of a sample computing environment 3800 with which the disclosed subject matter can interact. The sample computing environment 3800 includes one or more client(s) 3802. The client(s) 3802 can be hardware and/or software (e.g., threads, processes, computing devices). The sample computing environment 3800 also includes one or more server(s) 3804. The server(s) 3804 can also be hardware and/or software (e.g., threads, processes, computing devices). The servers 3804 can house threads to perform transformations by employing one or more embodiments as described herein, for example. One possible communication between a client 3802 and servers 3804 can be in the form of a data packet adapted to be transmitted between two or more computer processes. The sample computing environment 3800 includes a communication framework 3806 that can be employed to facilitate communications between the client(s) 3802 and the server(s) 3804. The client(s) 3802 are operably connected to one or more client data store(s) 3808 that can be employed to store information local to the client(s) 3802. Similarly, the server(s) 3804 are operably connected to one or more server data store(s) 3810 that can be employed to store information local to the servers 3804.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods illustrative of the disclosed subject matter. It is, of course, not possible to describe every combination of components or methodologies here. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system for monitoring a network architecture, comprising:
    an overlay panel configured to mount with respect to a bank of cable ports of a patch panel, wherein the overlay panel comprises:
        a sensor comprising electrical contacts that are located in proximity to a cable port, of the bank of cable ports, while the overlay panel is mounted with respect to the bank of cable ports, wherein the electrical contacts are configured to, in response to insertion of a cable plug having an attached memory device into the cable port, electrically connect to respective contact pads of the memory device, and wherein the sensor is configured to read, via the electrical contacts, cable identification data from the memory device attached to the cable plug;
        a universal serial bus (USB) interface configured to connect to a USB cable; and
        a controller configured to send the cable identification data to a network management device via the USB interface.

2. The system of claim 1, wherein the memory device comprises a 1-wire chip, and the sensor further comprises a 1-wire chip reading sensor configured to read the cable identification data from the 1-wire chip.

3. The system of claim 1, wherein the sensor further comprises at least one mechanical detection mechanism configured to distinguish between insertion of a first cable plug having the memory device attached thereto and insertion of a second cable plug that does not have the memory device attached thereto.

4. The system of claim 1, wherein the overlay panel further comprises an inter-integrated circuit (I2C) bus configured to convey control signaling and the cable identification data between the controller and the sensor.

5. The system of claim 4, wherein the overlay panel further comprises a conversion component configured to convert the cable identification data to a USB protocol prior to sending the cable identification data to the network management device via the USB interface.

6. The system of claim 5, wherein the conversion component comprises a serial-to-USB converter configured to covert the cable identification data from a serial protocol of the controller to the USB protocol.

7. The system of claim 1, wherein the overlay panel is compatible with one or more mechanical port security devices.

8. The system of claim 1, wherein the controller is further configured to update port configuration data for a network connected to the patch panel based on the cable identification data.

9. The system of claim 8, wherein the controller is further configured to send the port configuration data to the network management device in response to a request for the port configuration data received from the network management device via the USB interface.

10. The system of claim 8, wherein the controller is further configured to determine whether the cable identification data has changed for the cable port since a previous read operation by the sensor, and to send updated port configuration data to the network management device via the USB interface in response to a determination that the cable identification data has changed.

11. A method for monitoring a network architecture, comprising:
   detecting, by a control device of an overlay panel mounted over a bank of cable ports of a patch panel, insertion of a cable plug into a cable port of the bank of cable ports;
   in response to the detecting, reading, by the control device via electrical contacts mounted to the overlay panel, cable identification information from a memory device affixed to the cable plug, wherein the electrical contacts are located in proximity to the cable port and oriented to cause the electrical contacts to electrically connect to respective contact pads of the memory device in response to the insertion of the cable plug into the cable port; and
   sending, by the control device, the cable identification information directed to a network management device via a universal serial bus (USB) cable connected to the overlay panel.

12. The method of claim 11, wherein the reading comprises reading the cable identification information from a 1-wire chip.

13. The method of claim 11, wherein the detecting comprises determining that the cable plug includes the memory device affixed to the cable plug.

14. The method of claim 11, further comprising conveying the cable identification information from the memory device to the control device via an inter-integrated circuit (I2C) bus of the overlay panel.

15. The method of claim 14, further comprising converting the cable identification information from a serial protocol of the control device to a USB protocol prior to sending the cable identification information toward the network management device via the USB cable.

16. The method of claim 11, further comprising updating, by the control device, port configuration data for a network connected to the patch panel based on the cable identification information.

17. The method of claim 11, wherein the sending comprises sending the cable identification information in response to request data received from the network management device via the USB cable.

18. The method of claim 16, further comprising:
   detecting, by the control device, that the cable identification information has changed for the cable port since a previous read operation performed by the control device; and
   sending updated port configuration information directed to the network management device via the USB cable in response to the detecting.

19. A system, comprising:
   means for mounting an overlay panel with respect to a bank of cable ports of a patch panel;
   means for detecting insertion of a cable plug into a cable port of the bank of cable ports;
   means for reading, in response to the detecting via electrical contacts mounted to the overlay panel, cable identification data from a memory chip affixed to the cable plug, wherein the electrical contacts are located in proximity to the cable port and positioned to cause the electrical contacts to electrically interface to respective contact pads of the memory device in response to the insertion of the cable plug into the cable port; and
   means for conveying the cable identification data toward a network management device via a universal serial bus (USB) cable attached to the overlay panel.

20. The system of claim 19, wherein the means for reading comprises means for reading the cable identification information from a 1-wire chip.

* * * * *